(12) United States Patent
Nguyen et al.

(10) Patent No.: US 12,705,267 B1
(45) Date of Patent: Aug. 11, 2026

(54) QUERY PERMISSION PROPERTIES FOR CONTROLLING MODEL CONTEXT PROTOCOL (MCP) SERVER TOOL ACCESS

(71) Applicant: Notion Labs, Inc., San Francisco, CA (US)

(72) Inventors: Quan Nguyen, San Francisco, CA (US); Marissa Jessica Lafontant Felix, Brooklyn, NY (US); Kenneth Sinder, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/431,810

(22) Filed: Dec. 23, 2025

Related U.S. Application Data

(60) Provisional application No. 63/918,006, filed on Nov. 14, 2025.

(51) Int. Cl.
*G06F 16/3331* (2025.01)
*G06F 40/284* (2020.01)
*G06F 40/30* (2020.01)

(52) U.S. Cl.
CPC ........ *G06F 16/3331* (2019.01); *G06F 40/284* (2020.01); *G06F 40/30* (2020.01)

(58) Field of Classification Search
CPC ..... G06F 16/3331; G06F 40/284; G06F 40/30
USPC .......................................................... 707/769
See application file for complete search history.

(56) References Cited

U.S. PATENT DOCUMENTS

2025/0110949 A1* 4/2025 Roychowdhury .... G06F 16/212
2025/0284888 A1* 9/2025 Khullar ................. G06F 40/205
2025/0378106 A1* 12/2025 Manivannan ......... G06F 16/358
2026/0030240 A1* 1/2026 Koneru ................. G06F 16/243

* cited by examiner

*Primary Examiner* — Joshua Bullock
(74) *Attorney, Agent, or Firm* — Perkins Coie LLP; Alberto Araiza; Lena Petrovic

(57) ABSTRACT

Disclosed herein are systems, methods, and computer-readable media for connecting a model context protocol (MCP) server, an MCP client, and a workspace application. In some embodiments, a first query is received from a first MCP client and a second query is received from a second MCP client, where the queries are associated with different users having different query permission properties within the workspace application. The different query permission properties may result in different sets of tools being executed to respond to each query.

20 Claims, 10 Drawing Sheets

QUERY PERMISSION PROPERTIES FOR CONTROLLING MODEL CONTEXT PROTOCOL (MCP) SERVER TOOL ACCESS

CROSS-REFERENCE TO RELATED APPLICATION(S)

This application claims priority to and the benefit of U.S. Provisional Application No. 63/918,006, titled "MODEL CONTEXT PROTOCOL SERVER COMMUNICATION FOR A WORKSPACE APPLICATION" filed on Nov. 14, 2025, the contents of which is herein incorporated by reference in its entirety.

BACKGROUND

Artificial intelligence (AI) refers to the capability of computational systems to perform tasks typically associated with human intelligence, such as learning, reasoning, problem-solving, perception, and decision-making. Generative AI (sometimes called Gen AI) is a subfield of AI that uses generative models to produce text, images, videos, or other forms of data. These models learn the underlying patterns and structures of their training data and use them to produce new data based on the input, which often comes in the form of natural language prompts.

In recent years, there has been a significant proliferation of software tools that employ AI models, including generative AI models, to interpret natural language queries provided as input by a human user and return a natural language response as output. Agentic AI is a class of AI that focuses on autonomous systems that can make decisions and perform tasks with or without human intervention. The independent systems automatically respond to conditions, with procedural, algorithmic, and human-like creative steps, to produce process results.

The Model Context Protocol (MCP) is an open standard, open-source framework that defines standardized techniques for integrating AI systems with external data sources and tools. MCP includes specifications for data ingestion and transformation, contextual metadata tagging, and AI interoperability across different platforms. The protocol also supports secure, bidirectional connections between data sources and AI-powered tools. MCP enables developers to expose data via MCP servers or to develop AI applications-referred to as MCP clients—that connect to these servers. Key components of the protocol include a formal protocol specification and software development kits (SDKs), local MCP server support in certain desktop applications, and an open-source repository of MCP server implementations. Developers can create custom MCP servers to connect proprietary systems or specialized data sources to AI systems.

BRIEF DESCRIPTION OF THE DRAWINGS

Reference will now be made, by way of example, to the accompanying drawings, which show example embodiments of the present application and in which.

Figure 1:
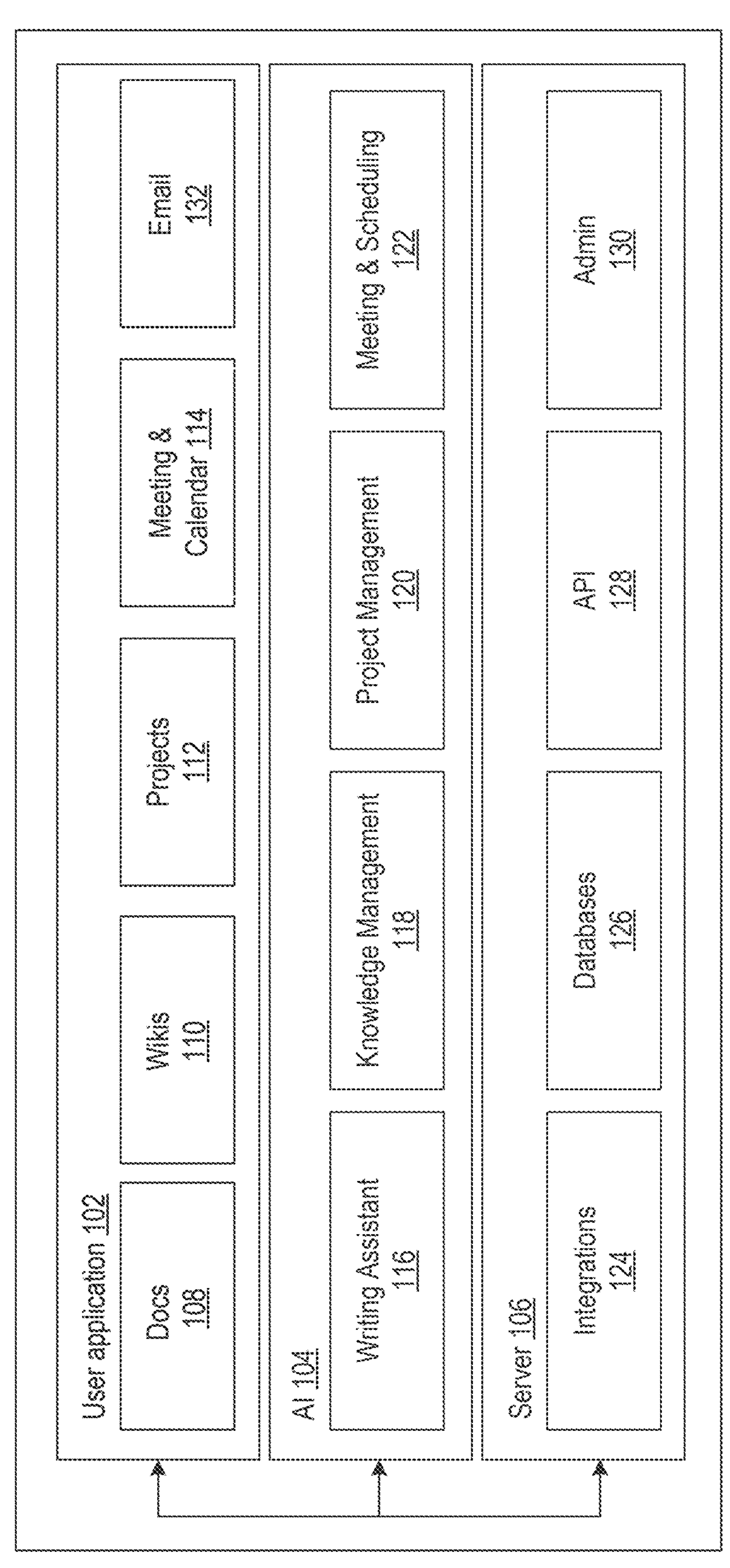
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references may indicate similar elements. While the drawings depict various implementations for the purpose of illustration, those skilled in the art will recognize that alternative implementations may be employed without departing from the principles of the present technologies. Accordingly, while specific implementations are shown in the drawings, the technology is amenable to various modifications.

DETAILED DESCRIPTION

Many existing systems for integrating artificial intelligence tools with external applications rely on custom-built integrations that require significant development effort for each new connection. These systems often create tightly coupled architectures where AI tools and external data sources are directly connected, making it difficult to reuse integrations across different AI clients or to maintain consistent security and access control policies between AI clients. When users want to connect multiple AI tools to their data stored in an external application (e.g., a workspace application including a suite of tools for data and/or project management), these users typically must configure each integration separately, leading to duplicated effort and inconsistent user experiences.

Many current approaches to AI-external application integration also present security challenges, as they often require users to share sensitive authentication credentials directly with AI clients or rely on broad access tokens that grant excessive permissions within the external application. Such approaches may struggle to provide granular access control based on user subscription levels or usage patterns/usage history, making it difficult for providers of applications that may integrate with AI clients to offer differentiated service tiers and/or access levels. Additionally, many existing solutions lack the ability to intelligently route queries to appropriate data and/or tools within external applications when access requests from AI clients are received, resulting in low-quality and/or inefficiently generated responses.

The Model Context Protocol (MCP) represents a standardized approach to addressing these integration challenges, as MCP provides a standard protocol for connecting AI tools to external applications. However, many implementations of MCP servers lack authentication mechanisms for verifying AI client identity, do not provide advanced AI-powered tools that can autonomously determine query response strategies, and/or fail to implement comprehensive access control systems that can differentiate generated responses based on a level of access that a user has to the application connected to the client by the MCP server.

The present disclosure describes systems, methods, and computer-readable media for implementing an MCP server that provides security-enhanced and adaptable integration, including agentic AI functionality, between AI-based third-party clients ("MCP clients") and a workspace application. The disclosed MCP server environment may address the limitations of many existing systems by implementing a dual-token architecture that separates external client authorization from internal API access control, enabling secure communication between MCP clients and the workspace application while maintaining granular permission management. The present technology may also use redirect uniform resource identifiers (URIs) to determine client trustworthiness before access is granted to the workspace application. For example, trusted client lists and blacklists may be maintained to reduce unauthorized access while allowing users to authorize connections with previously unknown but legitimate clients.

In some embodiments, the MCP server accesses agentic tools that serve as intelligent interfaces for processing natural language queries and autonomously determining sequences of tool calls to execute in response to user requests. These agentic tools use one or more AI agents to determine semantic meanings of queries, compare those meanings to descriptions associated with available tools, and select appropriate subsets of tools for execution. This approach may allow more complete context to be passed to tools of the workspace application than existing solutions and may improve efficiency of context token distribution, as the agentic tool can divide context tokens among other tools according to the relevant context for each tool. Additionally, computational resource expenditures associated with responding to a query may be monitored, and alternative query suggestions may be provided to users when those expenditures exceed a predetermined threshold. Thus, the present technology enables resource utilization of the MCP server to be improved over time by helping to reduce the number of queries received that are slow or expensive to process.

The present technology further implements access control mechanisms that differentiate user experiences based on subscription levels, sets of credits, and/or other entitlements within the workspace application, enabling tiered service levels within the workspace application while managing computational resource allocation across multiple users. For example, a first user associated with certain permission properties for queries transmitted to the MCP server may receive a response generated by accessing a first set of tools of the workspace application, while a second user associated with different permission properties that grant less comprehensive access to the tools may receive a different response generated by accessing a second, more limited, set of tools. This differentiation between users may enable the workspace application to limit the computational resources dedicated to individual users (e.g., to avoid excessive resource consumption), prompting more reliable experiences across users, and/or may enable the workspace application to monetize increased access to particular application features. Furthermore, access control enables the functionality that the MCP server provides for a user to be aligned with a level of access the user otherwise has to the workspace application, reducing the chances that the user circumvents the level of access intended for the user.

The description and associated drawings are illustrative examples and are not to be construed as limiting. This disclosure provides certain details for a thorough understanding and enabling description of these examples. One skilled in the relevant technology will understand, however, that the invention may be practiced without many of these details. Likewise, one skilled in the relevant technology will understand that the invention may include well-known structures or features that are not shown or described in detail to avoid unnecessarily obscuring the descriptions of examples.

Block Data Model

The disclosed technology includes a block data model ("block model"). The blocks are dynamic units of information that may be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block may have attributes including an identifier (ID), properties, and type. Each block is uniquely identifiable by its ID. The properties may include a data structure containing custom attributes about a specific block. An example of a property is "title," which stores text content of block types such as paragraphs, lists, and the title of a page. More elaborate block types require additional or different properties, such as a page block in a database with user-defined properties. Every block may have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which may be used for permissions. Blocks may be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks may be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block may add that block to the content of the nearest sibling block in the content tree.

Blocks may inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block may be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface-typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks may be performed by, for example, pressing Enter on a keyboard. First, the client defines all the initial attributes of the block, generating a new unique ID, setting the appropriate block type (to_do), and filling in the block's properties (an empty title, and checked: ["No"]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block may be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" Hypertext Transfer Protocol (HTTP) response to the original API request is sent by the client. This confirms that the client knows the transaction was saved successfully and that it may move on to saving the next transaction in the TransactionQueue. In the background, the block model schedules additional work depending on the kind of change made for the transaction. For example, the block model may schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client may have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks may be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 may include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 may include a variety of templates. A template refers to a prebuilt page that a user may add to a workspace within the user application 102. The templates may be directed to a variety of functions. Exemplary templates include a docs template 108, a wikis template 110, a projects template 112, a meeting and calendar template 114, and an email template 132. In some implementations, a user may generate, save, and share customized templates with other users.

The user application 102 templates may be based on content "blocks." For example, the templates of the user application 102 include a predefined and/or pre-organized set of blocks that may be customized by the user. Blocks are content containers within a template that may include text, images, objects, tables, maps, emails, and/or other pages (e.g., nested pages or sub-pages). Blocks may be assigned to certain properties. The blocks are defined by boundaries having dimensions. The boundaries may be visible or non-visible for users. For example, a block may be assigned as a text block (e.g., a block including text content), a heading block (e.g., a block including a heading), or a sub-heading block having a specific location and style to assist in organizing a page. A block may be assigned as a list block to include content in a list format. A block may be assigned as an AI prompt block (also referred to as a "prompt block") that enables a user to provide instructions (e.g., prompts) to the AI tool 104 to perform functions. A block may also be assigned to include audio, video, or image content.

A user may add, edit, and remove content from the blocks. The user may also organize the content within a page by moving the blocks around. In some implementations, the blocks are shared (e.g., by copying and pasting) between the different templates within a workspace. For example, a block embedded within multiple templates may be configured to show edits synchronously.

The docs template 108 is a document generation and organization tool that may be used for generating a variety of documents. For example, the docs template 108 may be used to generate pages that are easy to organize, navigate, and format. The wikis template 110 is a knowledge management application having features similar to the pages generated by the docs template 108 but that may additionally be used as a database. The wikis template 110 may include, for example, tags configured to categorize pages by topic and/or include an indication of whether the provided information is verified to indicate its accuracy and reliability. The projects template 112 is a project management and note-taking software tool. The projects template 112 may allow the users, either as individuals or as teams, to plan, manage, and execute projects in a single forum. The meeting and calendar template 114 is a tool for managing tasks and timelines. In addition to traditional calendar features, the meeting and calendar template 114 may include blocks for categorizing and prioritizing scheduled tasks, generating to-do and action item lists, tracking productivity, etc. The various templates of the user application 102 may be included under a single workspace and include synchronized blocks. For example, a user may update a project deadline on the projects template 112, which may be automatically synchronized to the meeting and calendar template 114. The various templates of the user application 102 may be shared within a team, allowing multiple users to modify and update the workspace concurrently.

The email template 132 allows the users to customize their inbox by representing the inbox as a customizable database where the user may add custom columns and create custom views with layouts. One view may include multiple layouts including a calendar layout, a summary layout, and an urgent information layout. Each view may include a customized structure including custom criteria, custom properties, and custom actions. The custom properties may be specific to a view such as AI-extracted properties and/or heuristic-based properties. The custom actions may trigger automatically when a message enters the view. The custom actions may include deterministic rules like "Archive this," or assistant workflows like responding to support messages by searching user applications 102 or filing support tickets. In addition, the view may include actions, such as buttons, that are custom to the view and perform operations on the messages in the inbox. Only the customized structure may be shared with other users of the system, or both the customized structure and the messages may be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 may include an embedding of a document within the platform 100, or an embedding of a block within the document. In another example, a wiki may link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 may interact with blocks embedded within the templates on a workspace of the user application 102. For example, the AI tool 104 may include a writing assistant tool 116, a knowledge management tool 118, a project management tool 120, and a meeting and scheduling tool 122. The different tools of the AI tool 104 may be interconnected and interact with different blocks and templates of the user application 102.

The writing assistant tool 116 may operate as a generative AI tool for creating content for the blocks in accordance with instructions received from a user. Creating the content may include, for example, summarizing, generating new text, or brainstorming ideas. For example, in response to a prompt received as a user input that instructs the AI to describe what the climate is like in New York, the writing assistant tool 116 may generate a block including text that describes the climate in New York. As another example, in response to a prompt that requests ideas on how to name a pet, the writing assistant tool 116 may generate a block including a list of creative pet names. The writing assistant tool 116 may also operate to modify existing text. For example, the writing assistant may shorten, lengthen, or translate existing text, correct grammar and typographical errors, or modify the style of the text (e.g., a social media style versus a formal style).

The knowledge management tool 118 may use AI to categorize, organize, and share knowledge included in the workspace. In some implementations, the knowledge management tool 118 may operate as a question-and-answer assistant. For example, a user may provide instructions on a prompt block to ask a question. In response to receiving the question, the knowledge management tool 118 may provide an answer to the question, for example, based on information included in the wikis template 110. The project management tool 120 may provide AI support for the projects template 112. The AI support may include autofilling information based on changes within the workspace or automatically tracking project development. For example, the project management tool 120 may use AI for task automation, data analysis, real-time monitoring of project development, allocation of resources, and/or risk mitigation. The meeting and scheduling tool 122 may use AI to organize meeting notes, unify meeting records, list key information from meeting minutes, and/or connect meeting notes with deliverable deadlines.

The server 106 may include various units (e.g., including compute and storage units) that enable the operations of the AI tool 104 and workspaces of the user application 102. The server 106 may include an integrations unit 124, an application programming interface (API) 128, databases 126, and an administration (admin) unit 130. The databases 126 are configured to store data associated with the blocks. The data associated with the blocks may include information about the content included in the blocks, the function associated with the blocks, and/or any other information related to the blocks. The API 128 may be configured to communicate the block data between the user application 102, the AI tool 104, and the databases 126. The API 128 may also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms may include other databases (e.g., cloud storage spaces), messaging software applications, or audio or video conference applications. The administration unit 130 is configured to manage and maintain the operations and tasks of the server 106. For example, the administration unit 130 may manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus may be created by extracting text from online webpages and/or publicly available social media posts. Training data may be annotated with ground truth labels (e.g., each data entry in the training dataset may be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent).

The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (e.g., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples may be used to generate language in a certain style or in a certain format. For example, the ML model may be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" may refer to an ML-based language model (e.g., a language model that is implemented using a neural network or other ML architecture), unless stated otherwise. For example, unless stated otherwise, the "language model" encompasses large language models (LLMs).

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
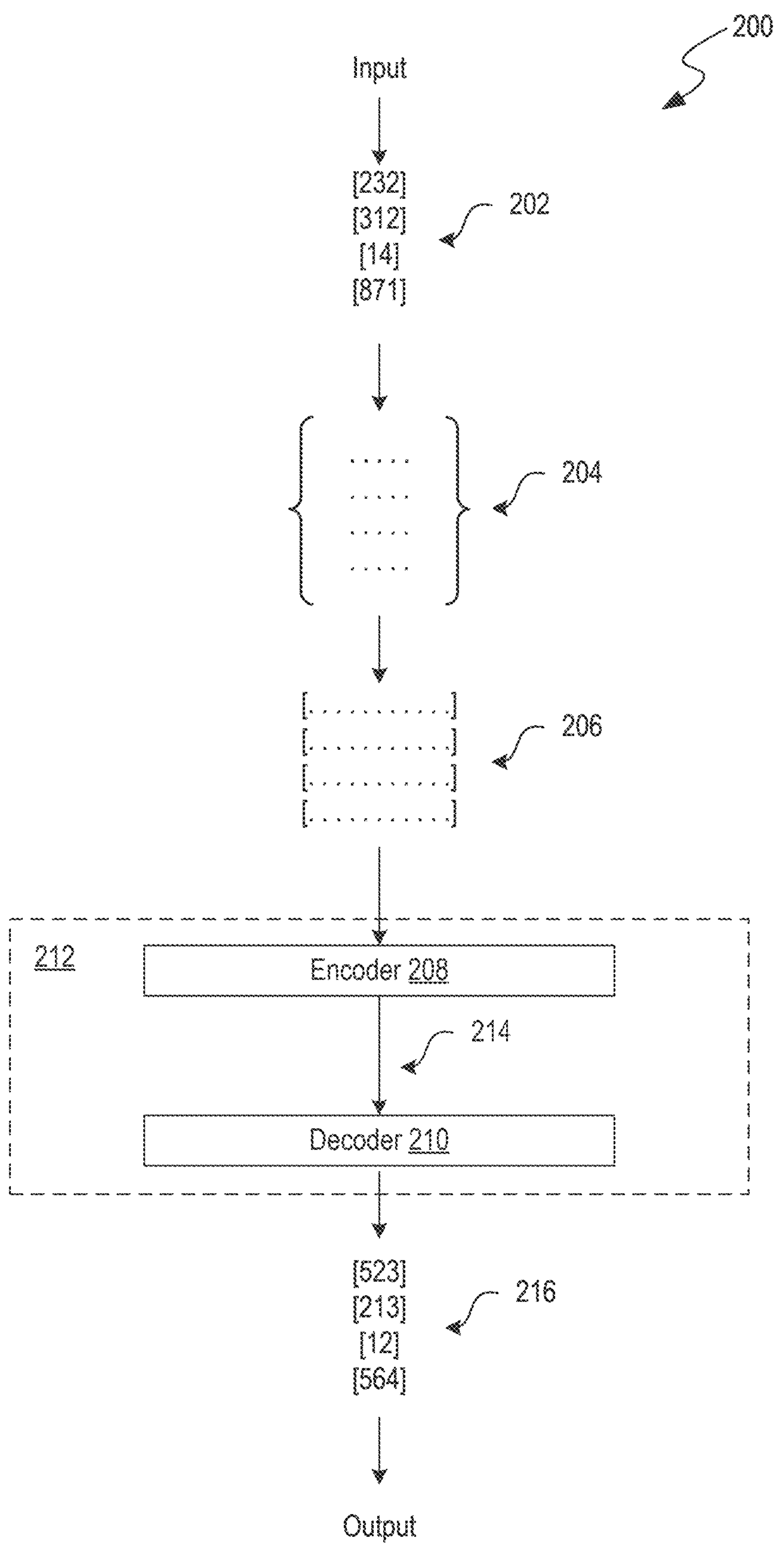
FIG. 2 is a block diagram of a transformer neural network, which may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which may include one or more encoder layers/blocks connected in series) and a decoder 210 (which may include one or more decoder layers/blocks connected in series). Generally, the encoder 208 and the decoder 210 each include multiple neural network layers, at least one of which may be a self-attention layer. The parameters of the neural network layers may be referred to as the parameters of the language model.

The transformer 212 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. Brainstorming ideas may include generating a list of ideas based on provided input. For example, the ML model may generate a list of names for a startup or costumes for an upcoming party. Writing a rough draft may include generating writing in a particular style that could be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, the transformer 212 is trained to perform certain functions on other input formats than natural language input. For example, the input may include objects, images, audio content, or video content, or a combination thereof.

The transformer 212 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens may provide formatting information, etc.

In FIG. 2, a short sequence of tokens 202 corresponding to the input text is illustrated as input to the transformer 212. Tokenization of the text sequence into the tokens 202 may be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 may be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space may be defined by the dimensions and values of the embedding vectors. Various techniques may be used to convert a token 202 to an embedding 206. For example, another trained ML model may be used to convert the token 202 into an embedding 206. In particular, another trained ML model may be used to convert the token 202 into an embedding 206 in a way that encodes additional information into the embedding 206 (e.g., a trained ML model may encode positional information about the position of the token 202 in the text sequence into the embedding 206). In some implementations, the numerical value of the token 202 may be used to look up the corresponding embedding in an embedding matrix 204, which may be learned during training of the transformer 212.

The generated embeddings 206 are input into the encoder 208. The encoder 208 serves to encode the embeddings 206 into feature vectors 214 that represent the latent features of the embeddings 206. The encoder 208 may encode positional information (i.e., information about the sequence of the input) in the feature vectors 214. The feature vectors 214 may have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that may be generated by the encoder 208 may be referred to as a latent space or feature space.

Conceptually, the decoder 210 is designed to map the features represented by the feature vectors 214 into meaningful output, which may depend on the task that was assigned to the transformer 212. For example, if the transformer 212 is used for a translation task, the decoder 210 may map the feature vectors 214 into text output in a target language different from the language of the original tokens 202. Generally, in a generative language model, the decoder 210 serves to decode the feature vectors 214 into a sequence of tokens. The decoder 210 may generate output tokens 216 one by one. Each output token 216 may be fed back as input to the decoder 210 in order to generate the next output token 216. By feeding back the generated output and applying self-attention, the decoder 210 may generate a sequence of output tokens 216 that has sequential meaning (e.g., the resulting output text sequence is understandable as a sentence and obeys grammatical rules). The decoder 210 may generate output tokens 216 until a special [EOT] token (indicating the end of the text) is generated. The resulting sequence of output tokens 216 may then be converted to a text sequence in post-processing. For example, each output token 216 may be an integer number that corresponds to a vocabulary index. By looking up the text segment using the vocabulary index, the text segment corresponding to each output token 216 may be retrieved, the text segments may be concatenated together, and the final output text sequence may be obtained.

In some implementations, the input provided to the transformer 212 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes). As an example, the input text may include meeting notes prepared by a user and the output may include a high-level summary of the meeting notes. In other examples, the input provided to the transformer includes a question or a request to generate text. The output may include a response to the question, text associated with the request, or a list of ideas associated with the request. For example, the input may include the question "What is the weather like in San Francisco?" and the output may include a description of the weather in San Francisco. As another example, the input may include a request to brainstorm names for a flower shop and the output may include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), may accept a large number of tokens as input (e.g., up to 2,048 input tokens), and is able to generate a large number of tokens as output (e.g., up to 2,048 tokens). GPT-3 has been trained as a generative model, meaning that it may process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the Internet. In some implementations, such as, for example, potentially in the case of a cloud-based language model, a remote language model may be hosted by a computer system that may include a plurality of cooperating (e.g., cooperating via a network) computer systems that may be in, for example, a distributed arrangement. Notably, a remote language model may employ multiple processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory), and providing output in a required timeframe (e.g., real time or near real time) may require the use of a plurality of processors/cooperating computing devices as discussed above.

Inputs to an LLM may be referred to as a prompt, which is a natural language input that includes instructions to the LLM to generate a desired output. A computer system may generate a prompt that is provided as input to the LLM via an API (e.g., the API 128 in FIG. 1). As described above, the prompt may optionally be processed or pre-processed into a token sequence prior to being provided as input to the LLM via its API. A prompt may include one or more examples of the desired output, which provides the LLM with additional information to enable the LLM to generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Hierarchical Organizational Blocks in a Workspace

Figure 3:
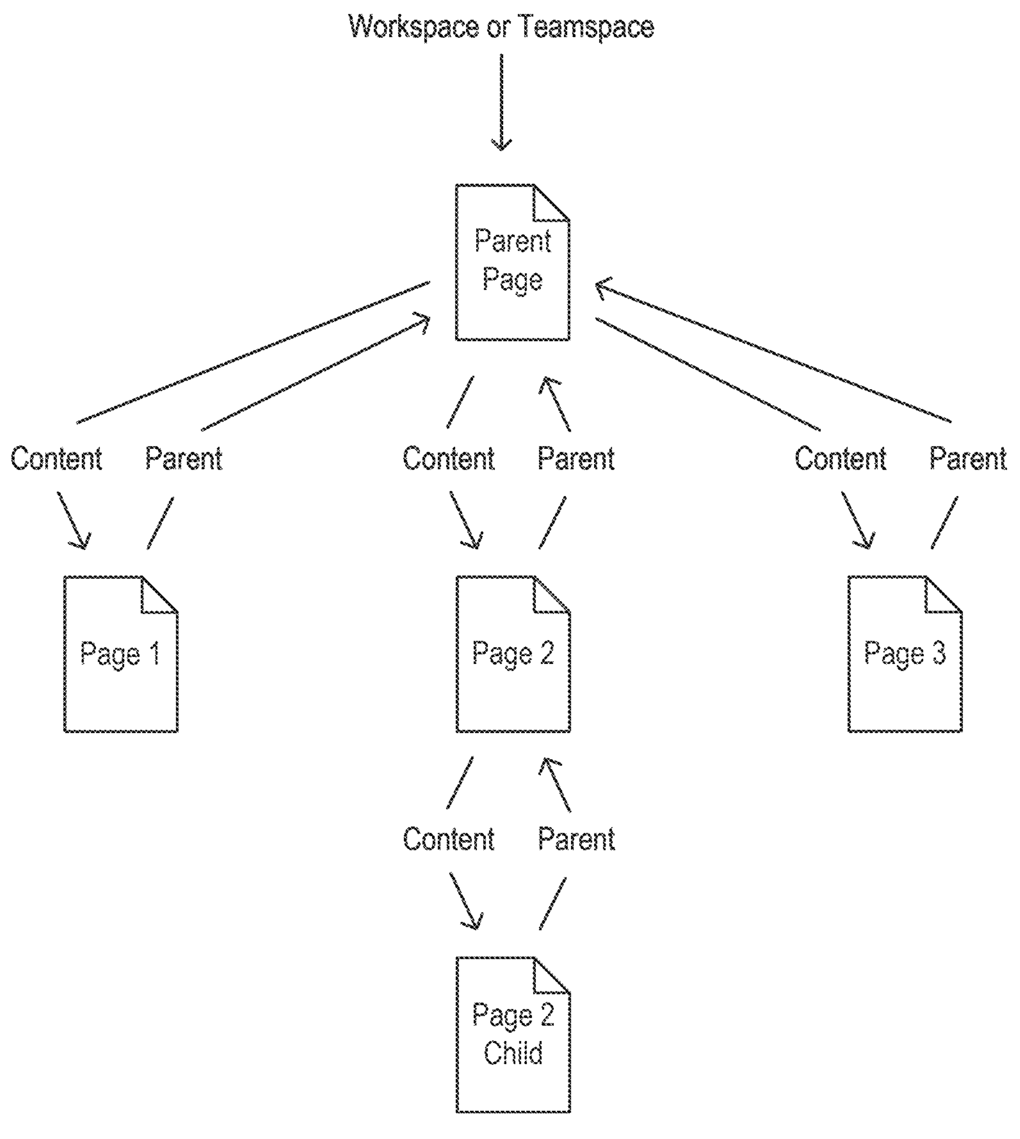
FIG. 3 is a block diagram illustrating a hierarchical organization of pages in a workspace, in accordance with some embodiments of the present technology.

FIG. 3 is a block diagram illustrating a hierarchical organization of pages in a workspace, in accordance with some embodiments of the present technology. As described with respect to the block data model of the present technology, a workspace may include multiple pages (e.g., page blocks). The pages (e.g., including parent pages and child or nested pages) may be arranged hierarchically within the workspace or one or more teamspaces, as shown in FIG. 3. The page may include a block such as tabs, lists, images, tables, etc.

A teamspace may refer to a collaborative space associated with a team or an organization that is hierarchically below a workspace. For example, a workspace may include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages may further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content may be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" may be automatically modified to correspond to the access permission of "Parent Page" based on the inheritance character of access permissions.

In contrast, however, a user may modify the access permission of the children independently of their parents. For example, the user may modify the access permission of "Page 2 Child" in FIG. 3 so that it is different from the access permission of "Page 2" and "Parent Page." The access permission of "Page 2 Child" may be modified to be broader or narrower than the access permission of its parents. As an example, "Page 2 Child" may be shared on the internet while "Page 2" is only shared internally to the users associated with the workspace. As another example, "Page 2 Child" may be shared only with an individual user while "Page 2" is shared with a group of users (e.g., a team of the organization associated with the workspace). In some implementations, the hierarchical inheritance of the access permissions described herein may be modified from the previous description. For example, the access permissions of all the pages (parent and children) may be defined as independently changeable.

Example Model Context Protocol Server Environment

Figure 4:
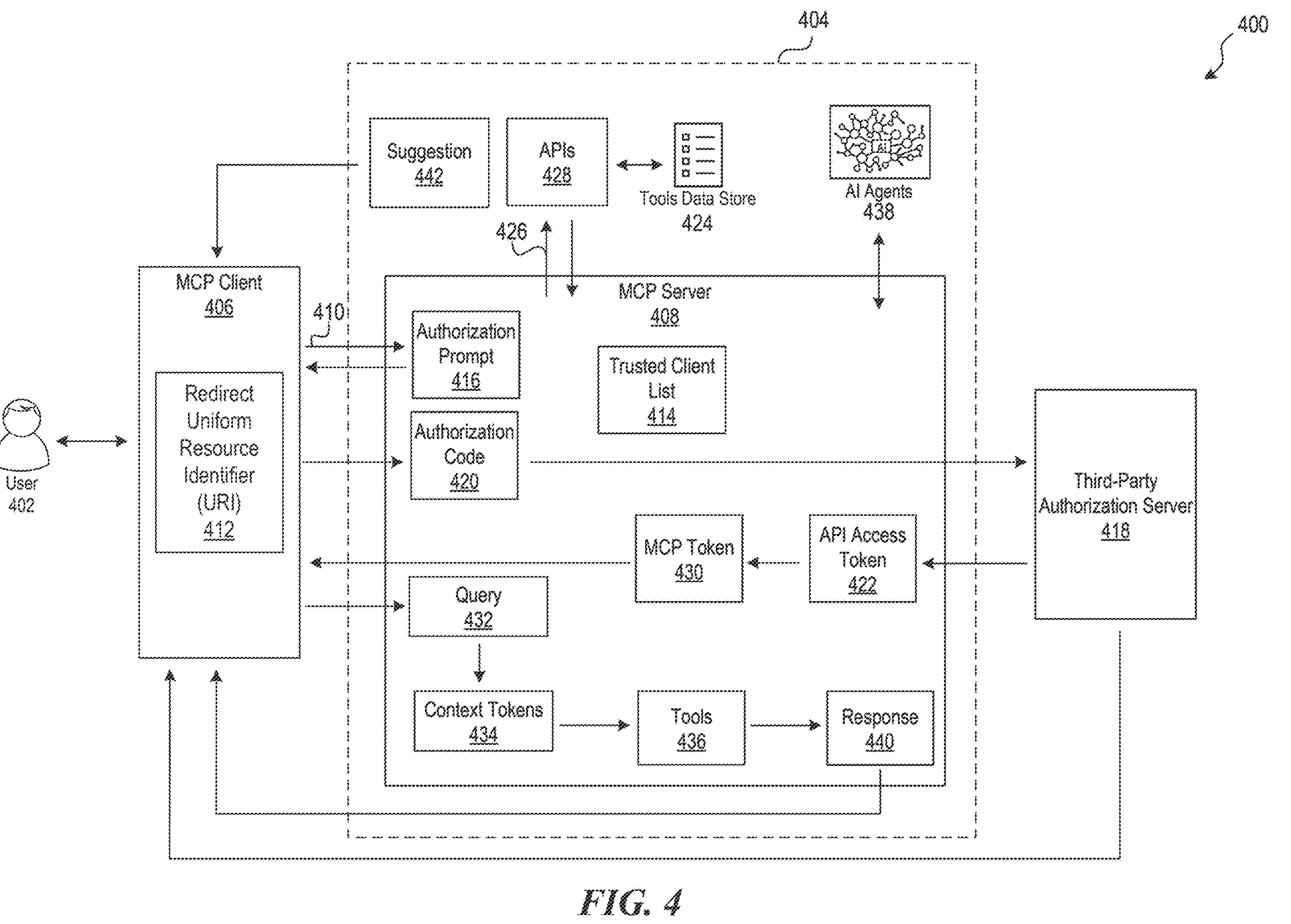
FIG. 4 illustrates an example model context protocol (MCP) server environment that processes queries directed to a workspace application, in accordance with some embodiments of the present technology.

FIG. 4 illustrates an example MCP server environment 400 that processes queries directed to a workspace application 404, in accordance with some embodiments of the present technology. As shown, the MCP server environment 400 includes a user 402, a workspace application 404, an MCP client 406, an MCP server 408, an access request 410, a redirect URI 412, a trusted client list 414, an authorization prompt 416, a third-party authorization server 418, an authorization code 420, an API access token 422, a tools data store 424, one or more API requests 426, one or more APIs 428, an MCP token 430, a query 432, a set of context tokens 434, one or more tools 436, one or more AI agents 438, a response 440, and a suggestion 442. The MCP server environment 400 may be implemented using components of the example computer system illustrated and described in more detail with reference to FIG. 10 below. Likewise, implementations of the example MCP server environment 400 may include different and/or additional components or may be connected in different ways.

The user 402 is an individual or entity with access to the workspace application 404, which is an application or other software component providing a suite of tools for data and/or project management (e.g., Notion®). One of the ways in which the user 402 may interact with the workspace application 404 is via an MCP client 406. The MCP client 406 is a software application including AI functionality (e.g., that executes one or more AI models) that is configured to communicate with an MCP server 408 by implementing some or all of the MCP. The user 402 may interact with the MCP client 406 to perform various computer-implemented tasks, including by prompting the MCP client 406 to send an access request 410 that requests access to (e.g., a communicative connection with) the MCP server 408. The MCP server 408 is a custom MCP server associated with a host/operator of the workspace application 404 via which data and/or functionality of the workspace application 404 is exposed to clients, such as the MCP client 406 and/or other clients such as integrated development environments (IDEs), terminal tools, and open-source MCP clients (with or without AI functionality), by implementing some or all of the MCP. The MCP server 408 may be hosted on commercial MCP infrastructure (e.g., Cloudflare®) and/or may support both Server-Sent Events (SSE) and Streamable HTTP transport protocols for client compatibility, allowing different types of MCP clients to establish connections using their preferred communication method. As depicted in FIG. 4, the MCP server 408 is included in the workspace application 404. However, in other embodiments, the MCP server 408 is a separate server that is communicatively coupled to the workspace application 404. The MCP client 406 may also generate the access request 410 itself without prompting by the user (e.g., in response to an AI agent of the MCP client 406 determining a connection with the MCP server 408 should be established).

In some embodiments, as depicted in FIG. 4, the workspace application 404 does not immediately grant the MCP client 406 access to the MCP server 408 in response to the access request 410 but instead performs one or more authorization steps to establish that the MCP client 406 is authorized to interact with the MCP server 408 (e.g., by transmitting queries, which are described in more detail below). For example, the workspace application 404 may determine, based on a redirect uniform resource identifier (URI) 412 associated with the MCP client 406, that the MCP client is a trusted client for accessing the MCP server 408. The redirect URI 412 is a unique string of characters identifying a resource hosted on the Internet (e.g., a webpage) and that is used to redirect users to predetermined Internet resources after one or more other actions are performed. Thus, the redirect URI 412 may redirect the user 402 to the MCP client 406 after the user 402 interacts with the workspace application 404 and/or another application. Using the redirect URI 412 as a form of identity verification for the MCP client 406 provides a technical advantage over other solutions because the redirect URI 412 redirects traffic exclusively to the MCP client 406, meaning that, assuming the redirect URI 412 is pre-verified by the workspace application 404 to redirect traffic to the MCP client 406, the workspace application 404 will always redirect traffic to the MCP client 406 rather than an impersonator, a potential interceptor, or another malicious actor when the redirect URI 412 is used.

The workspace application 404 may determine that the MCP client 406 is a trusted client based on the redirect URI 412 by maintaining a trusted client list 414 that includes one or more redirect URIs for clients that are authorized to access the MCP server 408. For example, the trusted client list 414 may be provided to the workspace application 404 by the user 402, thereby indicating that the user 402 has verified that any redirect URIs in the trusted client list 414 are associated with clients that are safe to connect to the MCP server 408. Additionally or alternatively, the workspace application 404 or an operator thereof may add a redirect URI of a client to the trusted client list 414 based on communicating with a client to determine the client's trustworthiness. The trusted client list 414 may be maintained within the MCP server 408, as depicted in FIG. 4, or elsewhere in the workspace application 404. The workspace application 404 may also maintain a blacklist of known malicious redirect URIs to automatically reject connections from identified threats, thereby conserving computational resources when future access requests are received from the malicious redirect URIs, as no further processing will occur to either authorize or process a query from those URIs.

In some embodiments, the workspace application 404 determines, based on the redirect URI 412, that the MCP client 406 is not a trusted client for accessing the MCP server 408 and therefore does not immediately grant access to the MCP client 406. Instead, the workspace application 404 may prompt the user 402 to designate the MCP client 406 as a trusted client before access is granted, thereby enabling the user 402 to authorize access for the MCP client 406 as desired even if the MCP client 406 was not previously included in the trusted client list 414. Alternatively, the workspace application 404 may notify the user that a connection between the MCP client 406 and MCP server 408 cannot be established and take no further action with respect to the access request 410. This approach enables the workspace application 404 to set prescribed limits on the clients that may connect to the MCP server 408, which may improve security and reduce exposure of data associated with the user 402 to potentially malicious parties.

In embodiments where the MCP client 406 is determined to be a trusted client, the workspace application 404 may generate an authorization prompt 416, which is a prompt presented to the user 402 (e.g., via the MCP client 406, as depicted in FIG. 4) to authorize a connection between the MCP client 406 and the MCP server 408. Although the MCP client 406 has already been determined to be a trusted client for connecting to the MCP server 408, the authorization prompt 416 may perform one or more additional verification functions beyond the trusted client determination. For example, the authorization prompt may redirect the user 402 to a third-party authorization server 418 from which the user 402 may obtain an authorization code 420. Alternatively, the MCP client 406 may redirect the user 402 to the third-party authorization server 418, and the authorization prompt 416 may separately inform the user 402 regarding the level of access to the workspace application 404 that the user 402 is being asked to authorize. The third-party authorization server 418 is a server hosted independently of the workspace application 404 that is configured to provide one or more tokens granting access to particular features of the workspace application 404 in response to the user 402 authorizing access to those features. For example, the third-party authorization server 418 may be an OAuth server or a server implementing another authorization protocol. Using the third-party authorization server 418 for the user 402 to authorize access to the workspace application 404 decouples authorization from authentication of the user 402, thereby enabling the user 402 to authenticate desired features without revealing excess personal information (e.g., a password of the user 402 for the workspace application 404 or the MCP server 408). However, the present invention is not so limited; the one or more tokens may, additionally or alternatively, be provided by the workspace application 404 (e.g., via a OAuth server hosted within the workspace application 404).

Figure 5:
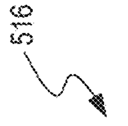
FIG. 5 illustrates an example authorization prompt, in accordance with some embodiments of the present technology.
Figure 5:
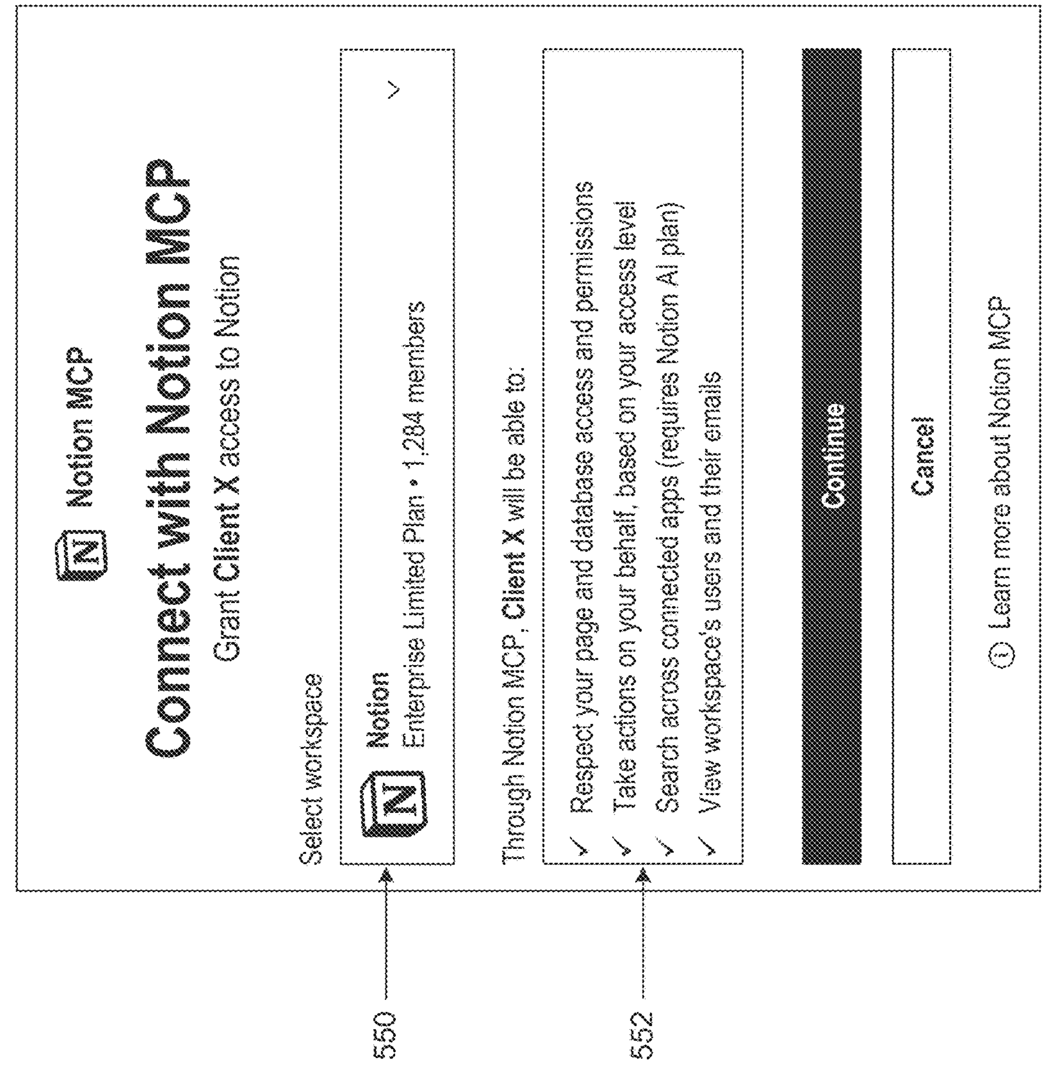

FIG. 5 illustrates an example authorization prompt 516, in accordance with some embodiments of the present technology. The authorization prompt 516 may enable the user 402 to authorize a connection between the MCP client 406 and the MCP server 408, as described above, and/or may describe the extent of the connection to be authorized. For example, the authorization prompt 516 may include a workspace identification field 550 that includes a name and/or a logo representing a particular workspace within the workspace application 404 (Notion®, as depicted) for which to grant access and a list of permissions 552 describing the privileges that the MCP client 406 ("Client X," as depicted) will have when the connection is authorized (e.g., by the user 402 selecting the "continue" button). Thus, the user 402 may be informed by the authorization prompt 516 of the nature of the connection that the user 402 may authorize and better control the authorized level of access, enabling the user 402 to make a more informed decision regarding whether the user 402 would like to expose particular data in the workspace application 404 to the MCP client 406 and/or protect sensitive data when desired.

Returning to FIG. 4, the third-party authorization server 418 may perform the authorization functions described above by generating the authorization code 420 and providing the authorization code 420 to the user 402 (e.g., via the MCP client 406). The authorization code 420 is a string of characters that is provided to indicate that the user 402 has authorized a connection between the MCP client 406 and the MCP server 408. Accordingly, the authorization code 420 may be provided to the third-party authorization server 418, causing the third-party authorization server 418 to provide the one or more tokens that grant the authorized access in exchange. In some embodiments, the authorization code 420 is received by the MCP server 408 from the user 402 (e.g., via the MCP client 406), and the MCP server 408 exchanges the authorization code 420 for the one or more tokens (e.g., OAuth access tokens and/or other strings associated with particular levels of access to data) and thereby accesses other functionality within the workspace application 404.

In some embodiments, the MCP server 408 retrieves, using the authorization code 420, an API access token 422 from the third-party authorization server 418. In other embodiments, the MCP server 408 retrieves, using the authorization code 420, the API access token 422 from elsewhere within the workspace application 404. The API access token 422 may be a token from the one or more tokens that authorizes the MCP server 408 to access a set of tools from within the workspace application 404. The MCP server 408 may execute each tool from the set of tools via one or more API requests 426 that are sent to one or more APIs 428 providing an interface for interactions with the set of tools. The set of tools may be included in a tools data store 424, which is a combination of hardware and/or software that stores a set of tools (e.g., in a page, a database, or another block) within the workspace application 404. In some embodiments, each tool from the set of tools, when executed, performs a particular function within the workspace application 404. For example, each tool may include a code segment or other executable computer instruction that causes the function to be performed when executed. In these and other embodiments, each tool from the set of tools is associated with a description of the particular function performed when the tool is executed. For example, the description may be a natural language text description of the function of a tool included in a data serialization language file (e.g., a JSON, YAML, or XML file) associated with the tool.

The tools data store 424 may include any of the tools described in relation to FIG. 1 above. Additionally or alternatively, the tools data store 424 may include tools for modifying a page (e.g., a page creation tool, a page update tool, a page deletion tool), modifying a database (e.g., a database creation tool, a database update tool, a database deletion tool), and/or for retrieving data from a database (e.g., a database query tool). The tools data store 424 may also include a tool for modifying an integration (e.g., an integration creation tool, an integration update tool, an integration deletion tool), modifying a trigger (e.g., a trigger creation tool, a trigger update tool, a trigger deletion tool), and/or modifying a script (e.g., a script creation tool, a script update tool, a script deletion tool). An integration is a heuristic/authorization scope followed by an AI agent when executing one or more instructions. For example, integrations may authorize particular actions of an AI agent by specifying tools that the AI agent may execute to perform actions and permissions determining the level of access granted to the AI agent within the workspace application 404. In some embodiments, the one or more AI agents 438 are associated with an integration that includes a set of access permissions based on an access permission of the user 402 (e.g., the integration provides a same or lower level of access than the user 402 has). For example, a trigger is a discrete event in response to which one or more actions may be performed within the workspace application 404, where the performance is by an AI agent and/or by deterministic execution. A script is a deterministic code segment that, when called (e.g., in response to a trigger), executes a set of instructions to generate an output.

After receiving the API access token 422, the MCP server 408 may generate an MCP token 430 based on the API access token 422. In other embodiments, the MCP token 430 may be generated by another component of the workspace application 404 is a same or generally similar manner. The MCP token 430 is a token that authorizes other applications that have the MCP token 430 (e.g., that store the MCP token 430 and/or transmit the MCP token 430 to the MCP server 408) to transmit queries to the MCP server 408. A query is an instruction and/or another communication received by the MCP server 408 directing the MCP server 408 to interact with data included elsewhere in the workspace application (e.g., by executing one or more tools from the set of tools). In some embodiments, the MCP token 430 is provided to the MCP client 406, which, in turn, transmits a query 432 associated with the MCP token 430 to the MCP server 408. In such embodiments, the query 432 may be either a natural language instruction based on which the MCP server 408 determines one or more tools to execute or a set of computer-readable instructions. Because the query 432 is associated with the MCP token 430, the MCP server 408 may authorize the MCP client 406 to transmit queries to the MCP server 408 based on receiving the query 432.

In some embodiments, the MCP server 408 determines, based on the query 432 and the MCP token 430, one or more tools 436 from the set of tools to access in response to the query 432. For example, the query 432 may be converted into a set of context tokens 434, where each token in the set of context tokens 434 is a token that may be parsed by an ML model, as described in relation to FIG. 2 above. The query 432 may be converted into the set of context tokens 434 by the MCP server 408 itself, as depicted in FIG. 4. However, in other embodiments, the user 402 provides the query 432 to the MCP client 406, which converts the query 432 into the set of context tokens 434 and then transmits the set to the MCP server 408. Continuing with the same example, the set of context tokens 434 may be provided to one or more AI agents 438 that determine a semantic meaning of the query 432 based on the set of context tokens 434 and compare that semantic meaning to one or more descriptions associated with one or more tools from the tools data store 424 to identify a subset of the set of tools to execute to respond to the query 432. Each agent from the one or more AI agents 438 may be a software component that invokes an AI model or algorithm, applies the model to an input, and processes the output of the model to automatically perform functions of the workspace application 404. For example, each AI agent may include one or more features of the AI tool 104 and/or the transformer 212 described in relation to FIGS. 1 and 2 above, respectively. Additionally or alternatively, each AI agent may invoke a commercial AI model such as GPT-4 or Claude 3.7 Sonnet. As depicted in FIG. 4, the one or more AI agents 438 are hosted within the workspace application 404, but, in other embodiments, the one or more AI agents 438 may be hosted in other applications.

As another example, the one or more tools 436 may be determined based on a set of credits associated with the user 402. The set of credits may represent an amount of previous API requests associated with the user 402 (e.g., API requests performed in response to queries originating from the user 402 and/or the MCP client 406), thereby tracking a total usage of the one or more APIs 428 attributable to the user 402. Thus, the workspace application 404 may use the set of credits to limit the number of usages of each API from the one or more APIs 428 attributable to the user 402. This determination technique for the one or more tools 436 may conserve computational resources of the workspace application 404 such that excess resources are not dedicated to the user 402 alone, enabling more reliable experiences across users and/or enabling the workspace application 404 to monetize increased access to the one or more APIs 428 (e.g., users may pay for an increase to their set of credits and thereby benefit from more API usage). Additionally or alternatively, the one or more tools 436 may be determined based on a subscription level associated with the user 402. The subscription level may be a particular level of access to features of the workspace application 404 for which the user 402 has paid and/or was otherwise assigned. Thus, the tools accessed by the MCP server 408 on behalf of the user 402 may be aligned with the tools accessible to the user 402 according to the set of credits and/or the subscription level associated with the user 402, preventing circumvention of these feature access control measures and limiting the computational resources necessary to maintain the workspace application 404.

In some embodiments, after the one or more tools 436 are determined, a first tool from the one or more tools 436 is executed via an API request from the one or more API requests 426, thereby generating a response 440. The response 440 is information responsive to the query 432 that is provided to the MCP client 406 and which may include an output of the first tool and/or a compilation of outputs from the one or more tools 436. In some embodiments, the response 440 is provided directly to the MCP client 406, while in others, the MCP server generates a data serialization language representation (e.g., a JSON, YAML, or XML file) of the response 440 and provides the data serialization language representation to the MCP client 406. Providing the data serialization representation of the response 440, rather than the response 440 itself, may allow the MCP client 406 to more efficiently interpret the response 440 and/or provide information to the user 402 because data serialization languages follow a stricter syntax than natural language or other computer languages that enable increased machine readability and faster and/or less error-prone processing (e.g., via one or more AI models) by the MCP client 406.

In some embodiments, the first tool is an agentic tool that invokes the one or more AI agents 438 to (1) determine a semantic meaning of the query 432, (2) compare the semantic meaning to descriptions associated with tools from the tools data store 424, and (3) determine a subset of tools to execute in response to the query 432, as described above. The agentic tool may then execute each tool from the subset, compile, using the one or more AI agents 438, the results from each tool execution, and generate the response 440 based on the compiled results. In some embodiments, executing each tool from the subset of tools includes, for each tool from the subset, (1) providing, as input, a subset of the set of context tokens 434 and (2) receiving, from the tool, a tool result that is generated as output. Additionally or alternatively, the agentic tool may execute each tool from the subset in a predetermined order specified in a plan. The plan may be generated by the one or more AI agents 438 and may represent a series of steps to be performed (e.g., by the one or more AI agent 438 and/or each tool from the subset) to respond to the query 432. Specifying an order for executing the tools may improve the reliability of responses, as certain tools may depend on the output of other tools to execute successfully and may therefore fail if not sequenced to execute after those other tools. Additionally or alternatively, the predetermined order may be chosen to increase a computational efficiency of generating the response 440 (e.g., as some orders of executing the one or more tools may be more efficient than others) and/or to increase a clarity of the response 440 (e.g., certain tools may provide certain information as output that serves as context for interpreting later tool outputs, enabling the outputs to eventually be combined/synthesized in a more coherent manner).

The subset of the set of context tokens 434 that is provided to each of the tools may be determined by the agentic tool itself (e.g., by invoking the one or more AI agents 438), which simplifies the exchange of the set of context tokens 434 such that each tool receives context that is particularly relevant to that tool, resulting in more efficient retrieval of data relevant to the query 432 by each tool. Furthermore, providing the set of context tokens 434 to the agentic tool rather than each tool from the subset of tools directly prevents the set of context tokens 434 from being copied multiple times, reducing computational cost without sacrificing the ability of each tool to retrieve relevant data. Additionally, providing the set of context tokens 434 directly to the agentic tool (e.g., rather than providing a list of individual API calls) may capture a high-level intent of the user 402 more effectively than more narrowly scoped representations of the query 432. As an illustration, when the user 402 provides the query 432 to the MCP client 406, the query 432 may express a high-level goal or problem that the user 402 wishes to solve, such as "research travel options for Japan and update my travel database." The agentic tool may receive the query 432 and may use the one or more AI agents 438 to break down the query 432 into constituent tasks, such as searching for travel information, creating new database entries, and updating existing records. By processing the query 432 at this high level, the workspace application 404 may gain insight into the user 402's actual objectives rather than only being instructed to perform individual tool executions, enabling the workspace application 404 itself to determine which tools to execute and resulting in more responsive query processing.

In some embodiments where an agentic tool is used, the agentic tool may select the subset of tools from a second set of tools that is different from a first set of tools that are accessible by the MCP server 408 generally. The second set of tools may include at least one tool that is not included in the first set of tools, thereby providing the agentic tool with access to a more comprehensive collection of tools (e.g., from the tools data store 424) than those directly exposed to the MCP server 408. This differentiated tool access may enable the agentic tool to leverage specialized or advanced functionality that may not be suitable for non-agentic processing, such as complex database operations, multi-step workflows, or enterprise-specific integrations. Additionally, this approach may improve computational efficiency by reducing the number of tools that the MCP client 406 and/or MCP server 408 are configured to interact with directly. These interactions may be streamlined by being handled by the agentic tool instead, as the number of tools the MCP client 406 and/or MCP server 408 manage information about is reduced and the agentic tool may use the more efficient context token distribution techniques described above to call the tools that the MCP client 406 and/or MCP server 408 cannot invoke directly.

In some embodiments where the one or more tools 436 are executed to generate a set of outputs, a determination is made within the workspace application 404 that a first computational resource expenditure associated with generation of the set of outputs exceeds a predetermined threshold. The first computational resource expenditure is a measure of the computational resources expended by the workspace application 404 to generate the set of outputs, and the predetermined threshold is a numerical value for computational resource expenditure (e.g., determined by the user 402 and/or an operator of the workspace application 404) above which expenditures for responding to a single query are considered excessive. In response to such a determination, the workspace application 404 may provide a suggestion 442 of an alternative query to the user 402 (e.g., via the MCP client 406). The suggestion 442 may be associated with a second computational resource expenditure below the predetermined threshold and therefore be expected to conserve computational resources of the workspace application 404 when followed for future queries in comparison to processing the query 432 itself. For example, where the query 432 includes a "where" clause specifying several requirements for the response 440, causing a significant expenditure of computational resources to generate the response 440 to satisfy each requirement, the suggestion 442 may be "Try using a more selective 'where' clause" or another similar suggestion. The second computational resource expenditure may be determined by a previous processing of a query following the suggestion 442, an expected computational expenditure associated with an action recommended in the suggestion 442, and/or the like.

Figure 6:
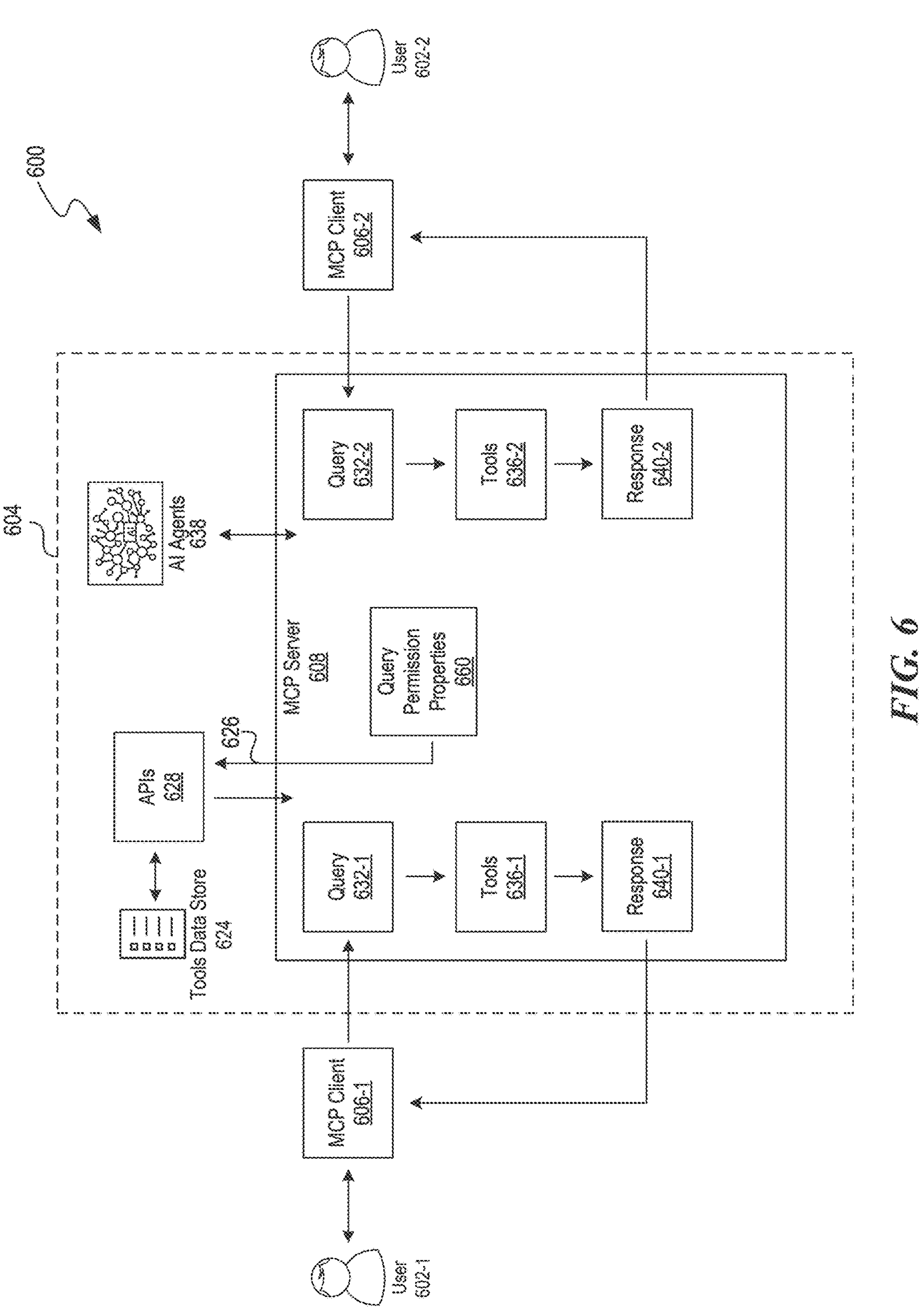
FIG. 6 illustrates a second example MCP server environment that processes queries from multiple users with different levels of access to a workspace application, in accordance with some embodiments of the present technology.

FIG. 6 illustrates a second example MCP server environment 600 that processes queries from multiple users with different levels of access to a workspace application 604, in accordance with some embodiments of the present technology. The MCP server environment 600 demonstrates how differentiated access control may be implemented to provide tiered functionality of the workspace application 604 based on user-specific entitlements. The MCP server environment 600 includes a first user 602-1, a second user 602-2, a workspace application 604, a first MCP client 606-1, a second MCP client 606-2, an MCP server 608, a tools data store 624, one or more API requests 626, one or more APIs 628, a first query 632-1, a second query 632-2, a first set of tools 636-1, a second set of tools 636-2, one or more AI agents 638, a first response 640-1, a second response 640-2, and query permission properties 660. The MCP server environment 600 may be implemented using components of the example computer system illustrated and described in more detail with reference to FIG. 10 below. Likewise, implementations of the example MCP server environment 600 may include different and/or additional components or may be connected in different ways.

The first user 602-1 and the second user 602-2 represent different individuals or entities with varying levels of access to the workspace application 604. Each user may interact with the workspace application 604 through their respective MCP clients. The first user 602-1 communicates with the workspace application 604 via the first MCP client 606-1, while the second user 602-2 interacts through the second MCP client 606-2. Each MCP client may be a software application that implements the MCP to enable AI-powered interactions with the workspace application 604, in a same or generally similar manner to the MCP client 406 described in relation to FIG. 4 above. Likewise, the workspace application 604 may be the same as or generally similar to the workspace application 404 described in relation to FIG. 4 above.

The first MCP client 606-1 transmits the first query 632-1 to the MCP server 608, and the second MCP client 606-2 transmits the second query 632-2 to the MCP server 608. Each query may represent a natural language instruction or computer-readable command directing the MCP server 608 to perform specific functions within the workspace application 604, in a same or similar manner to the query 432 described in relation to FIG. 4 above. The MCP server 608 receives both queries and processes them according to differing levels of access to the workspace application 604 associated with each user.

The query permission properties 660 are configuration settings or data structures that determine which tools from the tools data store 624 are accessible for responding to queries from different users. The tools data store 624 may be the same as or generally similar to the tools data store 424 described in relation to FIG. 4 above and may likewise contain a set of tools accessible via one or more API requests 626 to one or more APIs 628. The one or more API requests 626 and the one or more APIs 628 may, respectively, be the same as or generally similar to the one or more API requests 426 and the one or more APIs 428 described in relation to FIG. 4 above. The query permission properties 660 may be associated with particular users and may be based on various factors including user subscription levels, sets of credits associated with users, user roles, and/or other entitlements associated with users within the workspace application 604. For example, the first user 602-1 may be associated with a first query permission property from the query permission properties 660, while the second user 602-2 is associated with a second query permission property from the query permission properties 660 that is different from the first query permission property (e.g., does not grant a same level of access to the functionalities of the workspace application 604). As a specific example, the first user 602-1 may have a premium subscription level that grants access to advanced AI functionality including access to agentic tools, while the second user 602-2 may have a basic subscription level with limited tool access that does not include agentic tools. As another specific example, the first user 602-1 may have a first set of credits indicating the first user 602-1 has remaining access to a particular API for accessing a tool, while the second user 602-2 has a second set of credits indicating the second user 602-2 is associated with more usages of the particular API than the first user 602-1 and therefore no longer has access to the particular API/the tool.

Based on the query permission properties 660, the MCP server 608 selects the first set of tools 636-1 for responding to the first query 632-1 from the first user 602-1 and selects the second set of tools 636-2 for responding to the second query 632-2 from the second user 602-2. The first set of tools 636-1 and the second set of tools 636-2 may include different tools based on the respective permission properties associated with each user. For example, the first set of tools 636-1 may include at least one tool that is not included in the second set of tools 636-2. In these and other implementations, a particular tool may be shared between the first set of tools 636-1 and the second set of tools 636-2, but the functionality of that tool may be modified based on the respective permission properties associated with each user. For example, a database search tool may activate agentic search features for the first user 602-1 where the first user 602-1 has a premium subscription level and may not activate this same feature for the second user 602-2 where the second user 602-2 has a lower subscription level.

The MCP server 608 generates the first response 640-1 to the first query 632-1 and provides the first response 640-1 to the first MCP client 606-1. Similarly, the MCP server 608 generates the second response 640-2 to the second query 632-2 and provides the second response 640-2 to the second MCP client 606-2. The responses may differ in complexity, detail, or functionality based on the tools available to each user through their respective permission properties. In some embodiments, one or more AI agents 638 are used to determine a semantic meaning of the first query 632-1 and/or the second query 632-2, compare the semantic meaning(s) to descriptions associated with tools from the tools data store 624, and determine a subset of tools to execute in response to the first query 632-1 and/or the second query 632-2. Additionally or alternatively, the one or more AI agents 638 may compile tool results received from executing a subset of the first set of tools 636-1 and/or a subset of the second set of tools 636-2 to generate the first response 640-1 and/or the second response 640-2, respectively. The one or more AI agents 638 may be the same as or generally similar to the one or more AI agents 438 described in relation to FIG. 4 above but may apply different processing logic based on the query permission properties 660 associated with each user. For example, when processing the first query 632-1, the one or more AI agents 638 may have access to a broader range of tool descriptions and may generate more sophisticated execution plans, while processing of the second query 632-2 may be constrained to a more limited set of available tools.

In some implementations, the workspace application 604 may determine that the second set of tools 636-2 (e.g., as determined by the second query permission property associated with the second user 602-2) is insufficient to respond to the second query 632-2. For example, the determination may be made by identifying that a tool known to be required for responding to queries having a semantic meaning similar to that of the second query 632-2 is not included in the second set of tools 636-2. In such implementations, an insufficiency notification indicating that the second query 632-2 cannot fully be responded to is generated as the second response 640-2. Thus, the workspace application 604 may be prevented from expending computational resources on generating a response to the second query 632-2 that would be incomplete and/or misleading, helping to improve efficiency and user response quality. This approach may also enable the workspace application 604 to provide clear feedback to users about their current access levels while encouraging upgrades to higher levels of access (e.g., higher subscription levels, additional credits) when additional functionality is desired.

Example Sequence and Method Flows

Figure 7:
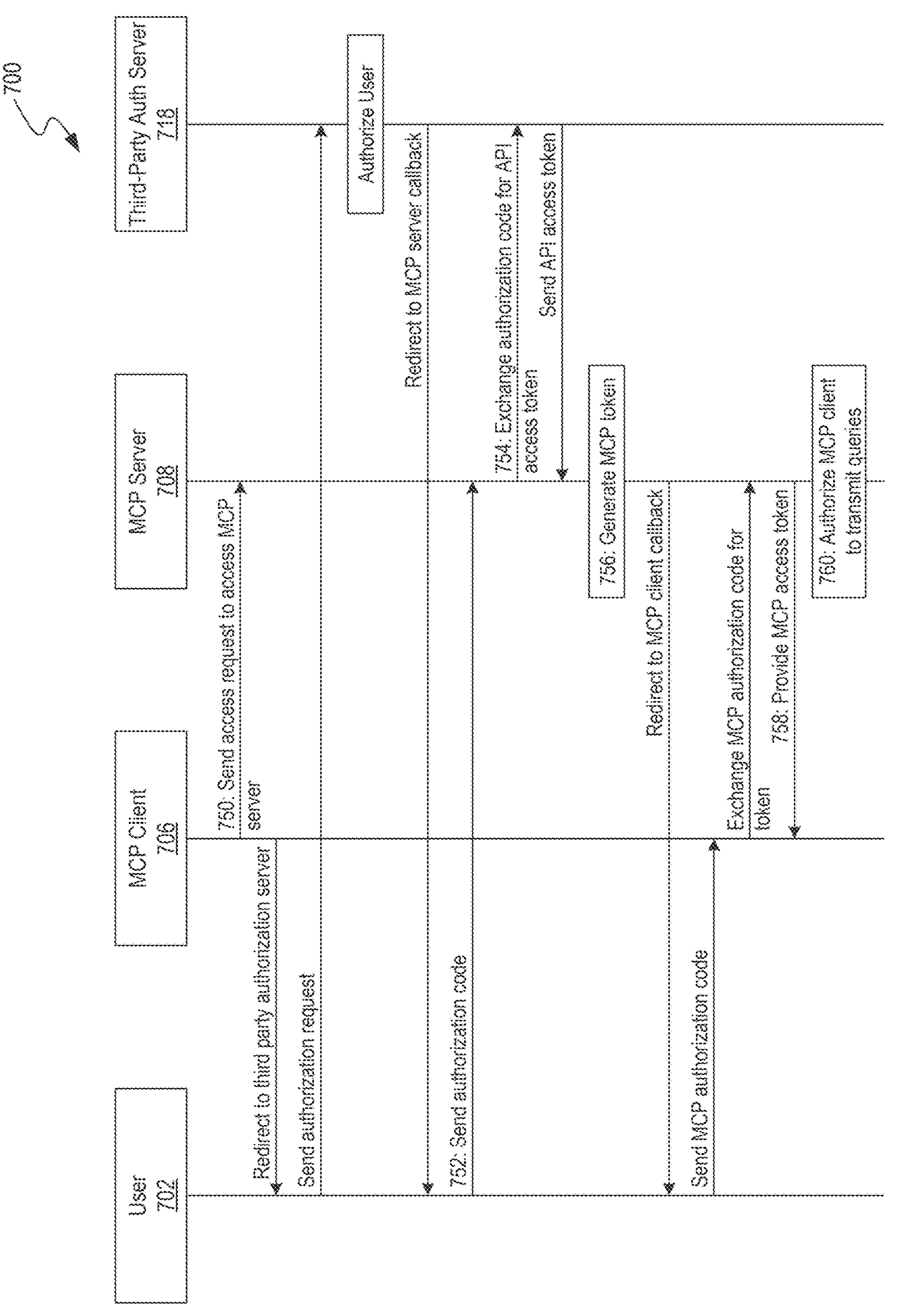
FIG. 7 is a flow diagram illustrating an example method for establishing secure communication between an MCP client and an MCP server within a workspace application environment, in accordance with some embodiments of the present technology.

FIG. 7 is a sequence diagram illustrating an example sequence 700 for establishing secure communication between an MCP client 706 and an MCP server 708 within a workspace application environment, in accordance with some embodiments of the present technology. As depicted, the sequence 700 is performed by a user 702, the MCP client 706, the MCP server 708, and a third-party authorization server 718, which may, respectively, be the same as or generally similar to the user 402, the MCP client 406, the MCP server 408, and the third-party authorization server 418. Additionally or alternatively, the sequence 700 may be performed by components of the example computer system illustrated and described in more detail in relation to FIG. 10 below, the workspace application 404 described in relation to FIG. 4, and/or the workspace application 604 described in relation to FIG. 6. Likewise, embodiments may include different and/or additional operations or may perform the operations in different orders.

In operation 750, an access request is sent by the MCP client 706 to access the MCP server 708. The access request may be generated by the MCP client 706 in response to a user instruction or may be automatically generated when the MCP client 706 determines that access to workspace application data is required. Following operation 750, the MCP client 706 may redirect the user 702 to the third-party authorization server 718 (e.g., via an authorization prompt 416, as described in relation to FIG. 4 above) to proceed with authorization of further operations of the MCP server 708. The user 702 may then send an authorization request to the third-party authorization server 718, in response to which the third-party authorization server 718 authorizes the user 702 (e.g., by providing an authorization code, such as the authorization code 420 described in relation to FIG. 4 above, to the user 702). The user 702 may be authorized after the user 702 completes an OAuth flow or similar authorization process through the third-party authorization server 718. As depicted in FIG. 7, the third-party authorization server 718 may also redirect the user 702 back to the MCP server 708 now that the user 702 has been successfully authorized.

In operation 752, an authorization code is sent from the user 702 to the MCP server 708. The authorization code indicates that the user 702 has authorized, via the third-party authorization server 718, a connection between the MCP client 706 and the MCP server 708. Then, in operation 754, the MCP server 708 exchanges the authorization code for an API access token that is sent from the third-party authorization server 718 to the MCP server 708. The API access token may authorize the MCP server 708 to access a set of tools in response to queries from MCP clients having an MCP token based on the API access token. For example, the API access token may be the same as or generally similar to the API access token 422 as described in relation to FIG. 4 above. Each tool from the set of tools, when executed, may perform a particular function within a workspace application and may be executable, by the MCP server 708, via one or more API requests. The set of tools may be the same as or generally similar to the one or more tools 436 as described in relation to FIG. 4 above. The workspace application may be the same as or generally similar to the workspace application 404 as described in relation to FIG. 4 above. The one or more API requests may be the same as or generally similar to the one or more API requests 426 as described in relation to FIG. 4 above. In some embodiments, the set of tools is based on a subscription level of the user 702.

In operation 756, the MCP token is generated, by the MCP server 708, based on the API access token. The MCP token may be the same as or generally similar to the MCP token 430 as described in relation to FIG. 4 above. The MCP server 708 may then redirect the user 702 to an MCP client callback, in response to which the user 702 sends an MCP authorization code to the MCP client 706, which may then exchange the MCP authorization code for the MCP token. The MCP authorization code may be the same as or generally similar to the authorization code described above, except that the MCP authorization code is associated with the MCP token rather than the API access token. In operation 758, the MCP token is provided, by the MCP server 708, to the MCP client 706 (e.g., in response to receiving the MCP authorization code from the MCP client 706).

In operation 760, the MCP client 706 is authorized, by the MCP server 708, to transmit queries to the MCP server 708. For example, this authorization may be based on receiving a query, from the MCP client 706, associated with the MCP token. The query may include natural language instructions or computer-readable commands directing the MCP server 708 to perform specific functions within the workspace application. The query may be the same as or generally similar to the query 432 as described in relation to FIG. 4 above.

In some embodiments, the sequence 700 further includes the MCP server 708 determining, based on a redirect URI associated with the MCP client 706, that the MCP client 706 is a trusted client for accessing the MCP server 708 and, in response to the determination that the MCP client 706 is a trusted client, prompting the user 702 to authorize the connection between the MCP client 706 and the MCP server 708. The determination that the MCP client 706 is a trusted client may be based on a list of trusted clients provided by the user 702. The redirect URI may be the same as or generally similar to the redirect URI 412 as described in relation to FIG. 4 above. Additionally or alternatively, a second access request from a second MCP client may be received. In such embodiments, the sequence 700 may further include the MCP server 708 determining, based on a second redirect URI associated with the second MCP client, that the second MCP client is not a trusted client for accessing the MCP server 708 and, in response to the determining, either prompting the user 702 to designate the second MCP client as a trusted client or notifying the user 702 that the connection between the second MCP client and the MCP server 708 cannot be established.

In these and other embodiments, the sequence 700 further includes the MCP server 708 receiving, from the MCP client 706, the query associated with the MCP token, determining, based on the query and the MCP token, a first tool from the set of tools to access in response to the query, and executing, via an API request, the first tool, thereby generating a response. The response may be the same as or generally similar to the response 440 as described in relation to FIG. 4 above. The response may also be an individual component of the response 440 that is combined with one or more other responses to generate the response 440. After the response is generated, a data serialization language representation of the response may be generated and provided to the MCP client 706.

In additional embodiments, the sequence 700 further includes the MCP server 708 receiving, from the MCP client 706, the query associated with the MCP token and determining, based on a set of credits associated with the user 702, a subset of the set of tools for the MCP server 708 to access in response to queries associated with the user 702. The set of credits may represent an amount of previous API requests associated with the user 702, as described in relation to FIG. 4 above. The MCP server 708 may then determine, based on the query and the MCP token, a first tool from the subset to access in response to the query. The first tool may then be executed via an API request to generate a response.

In some embodiments, after receiving, from the MCP client 706, the query associated with the MCP token, the MCP server 708 executes one or more tools from the set of tools via one or more API requests, thereby generating a set of outputs. A determination is then made, by the MCP server 708, that a first computational resource expenditure associated with generation of the set of outputs exceeds a predetermined threshold, and, in response to the determination, a suggestion of an alternative query is provided to the user 702. The alternative query may be associated with a second computational resource expenditure below the predetermined threshold. The suggestion may be the same as or generally similar to the suggestion 442 as described in relation to FIG. 4 above.

Figure 8:
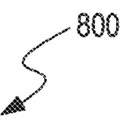
FIG. 8 is a flow diagram illustrating an example method for processing queries through an agentic tool within an MCP server environment, in accordance with some embodiments of the present technology.
Figure 8:
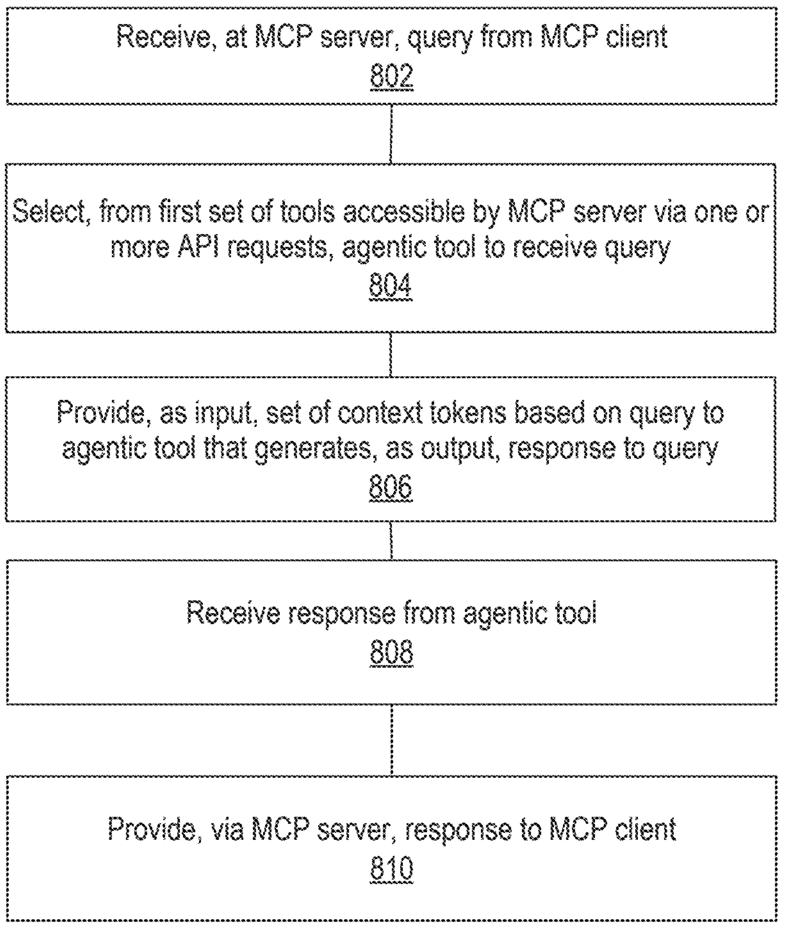

FIG. 8 is a flow diagram illustrating an example method 800 for processing queries through an agentic tool within an MCP server environment, in accordance with some embodiments of the present technology. In some embodiments, the method 800 is performed by components of the example computer system illustrated and described in more detail in relation to FIG. 10 below, the workspace application 404 described in relation to FIG. 4, and/or the workspace application 604 described in relation to FIG. 6. Likewise, embodiments may include different and/or additional operations or may perform the operations in different orders.

In operation 802, a query is received, at an MCP server, from an MCP client. The query may include natural language instructions or computer-readable commands directing the MCP server to perform specific functions within a workspace application. The workspace application may be the same as or generally similar to the workspace application 404 as described in relation to FIG. 4 above. The MCP server may be the same as or generally similar to the MCP server 408 as described in relation to FIG. 4 above. The MCP client may be the same as or generally similar to the MCP client 406 as described in relation to FIG. 4 above.

In operation 804, an agentic tool is selected, from a first set of tools accessible by the MCP server via one or more API requests, to receive the query. Each tool from the first set of tools, when executed, may perform a particular function within a workspace application. Each tool from the first set of tools may also be associated with a description of the particular function performed when the tool is executed. The first set of tools may be the same as or generally similar to the one or more tools 436 as described in relation to FIG. 4 above. In some embodiments, the set of tools includes at least one of a search tool, a page creation tool, a page update tool, a page deletion tool, a database creation tool, a database update tool, a database deletion tool, or a database query tool. In these and other embodiments, the set of tools includes at least one of an integration creation tool, an integration update tool, an integration deletion tool, a trigger creation tool, a trigger update tool, a trigger deletion tool, a script creation tool, a script update tool, or a script deletion tool. Additionally or alternatively, the set of tools may be based on a subscription level associated with a user of the MCP client. The agentic tool may be a specialized tool that serves as an intelligent interface for processing natural language queries and autonomously determining sequences of tool calls to execute. For example, the agentic tool may be an agentic tool that invokes one or more AI agents 438, as described in relation to FIG. 4 above.

In operation 806, a set of context tokens based on the query is provided as input to the agentic tool that generates, as output, a response to the query. The set of context tokens may be generated by converting the query into tokens that may be parsed by an ML model (e.g., as described in relation to FIG. 2 above). The set of context tokens may be the same as or generally similar to the set of context tokens 434 as described in relation to FIG. 4 above. The response may be the same as or generally similar to the response 440 as described in relation to FIG. 4 above. The agentic tool may generate the response by first determining a subset of a second set of tools to execute to respond to the query. The second set of tools may include at least one tool that is not included in the first set of tools, thereby enabling the agentic tool to access more tools of the workspace application than are exposed to the MCP server directly. The subset of the second set of tools may be determined based on a set of credits associated with a user of the MCP client, where the set of credits represents an amount of previous API requests associated with the user.

For each tool from the subset of the second set of tools, a subset of the set of context tokens may be provided, as input, to the tool that generates, as output, a tool result. Each tool may be provided the relevant portion of the context tokens to perform its specific function within the workspace application rather than the entirety of the set of context tokens, conserving computational resources and helping to generate more relevant responses. The tool result from each tool in the subset of the second set of tools may be received and compiled, using one or more AI agents, to generate the response. The one or more AI agents may be the same as or similar to the one or more AI agents 438, as described in relation to FIG. 4 above. In some embodiments, the one or more AI agents are associated with an integration including a set of access permissions, and the set of access permissions is based on an access permission of a user of the MCP client.

In some embodiments, the agentic tool further generates, as output, the response by, based on the subset of the second set of tools and the semantic meaning, generating, using the one or more AI agents, a plan including instructions for executing each tool from the subset of the second set of tools in a predetermined order to respond to the query. Input may then be provided to each tool from the subset of the second set of tools in the predetermined order. In these and other embodiments, a semantic meaning of the query may be determined using the one or more AI agents (e.g., by analyzing the set of context tokens to understand the intent and requirements expressed in the query). The semantic meaning may then be compared, using the one or more AI agents, to one or more descriptions associated with one or more tools from the second set of tools. The subset of the second set of tools to execute to respond to the query may then be determined, using the one or more AI agents, based on the comparing.

In operation 808, the response is received from the agentic tool and, in operation 810, the response is provided, via the MCP server, to the MCP client. The response may be transmitted to the MCP client in a format that enables the client to present the information to the user or use it for further processing, such as a data serialization language representation. In some embodiments, the method 800 further includes determining that a first computational resource expenditure associated with generation of the response exceeds a predetermined threshold and, in response to the determination that the first computational resource expenditure exceeds the predetermined threshold, providing a suggestion of an alternative query to a user of the MCP client. The alternative query may be associated with a second computational resource expenditure below the predetermined threshold.

Figure 9:
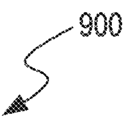
FIG. 9 is a flow diagram illustrating an example method for providing different responses to queries from users having different levels of access to a workspace application, in accordance with some embodiments of the present technology.
Figure 9:
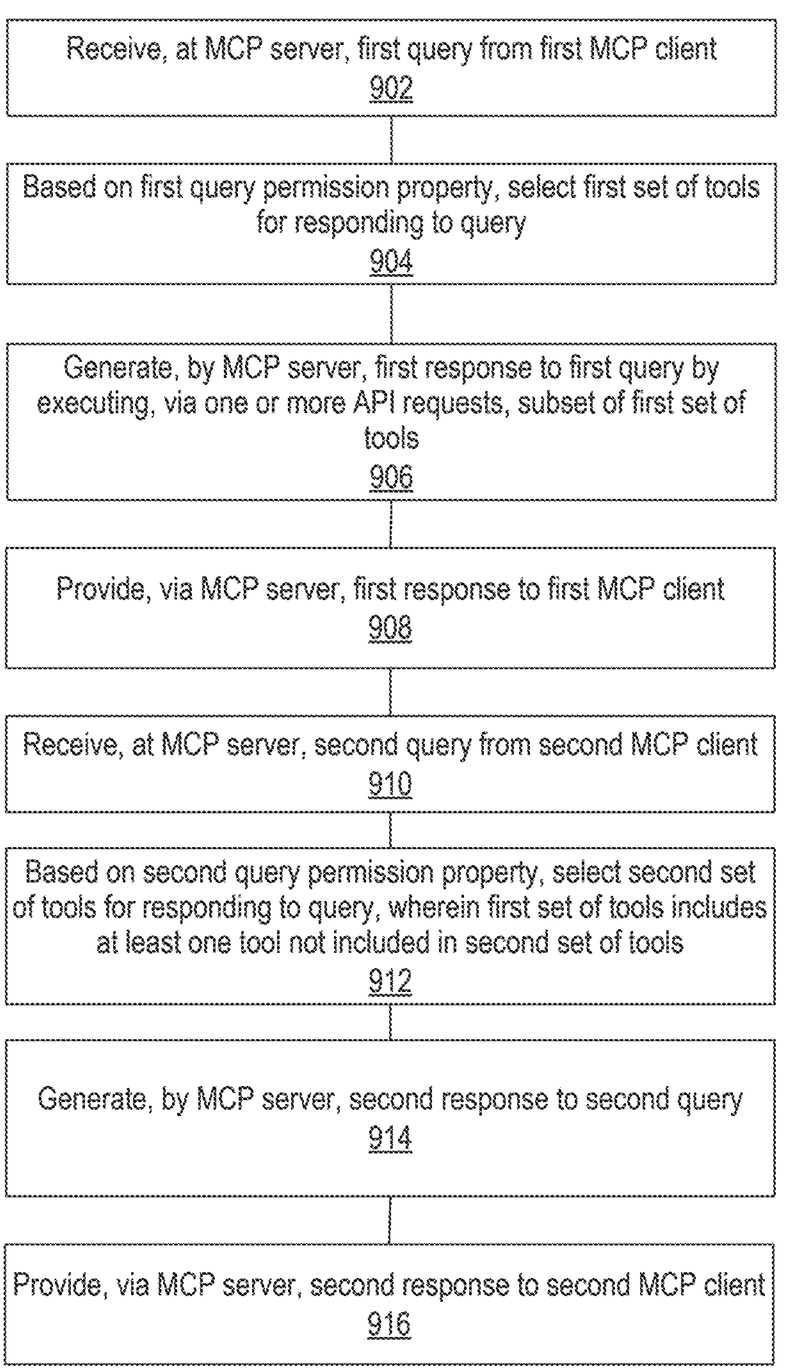

FIG. 9 is a flow diagram illustrating an example method 900 for providing different responses to queries from users having different levels of access to a workspace application, in accordance with some embodiments of the present technology. In some embodiments, the method 900 is performed by components of the example computer system illustrated and described in more detail in relation to FIG. 10 below, the workspace application 404 described in relation to FIG. 4, and/or the workspace application 604 described in relation to FIG. 6. Likewise, embodiments may include different and/or additional operations or may perform the operations in different orders.

In operation 902, a first query is received, at an MCP server, from a first MCP client. The first query is associated with a first user of a workspace application, and the first user is associated, within the workspace application, with a first query permission property. The first query may include natural language instructions or computer-readable commands directing the MCP server to perform specific functions within the workspace application. The MCP server can be the same as or generally similar to the MCP server 608 as described in relation to FIG. 6 above. The first MCP client can be the same as or generally similar to the first MCP client 606-1 as described in relation to FIG. 6 above. The first user can be the same as or generally similar to the first user 602-1 as described in relation to FIG. 6 above. The workspace application can be the same as or generally similar to the workspace application 604 as described in relation to FIG. 6 above. The first query permission property may be a configuration setting or data structure that determines which tools are accessible for responding to queries from the first user.

In operation 904, a first set of tools is selected for responding to the query based on the first query permission property. Each tool from the first set of tools may be accessible by the MCP server via one or more API requests, and each tool from the first set of tools, when executed, may perform a particular function within the workspace application. Each tool from the first set of tools may also be associated with a description of the particular function performed when the tool is executed. The first set of tools can be the same as or generally similar to the first set of tools 636-1 as described in relation to FIG. 6 above. In some embodiments, the first query permission property is based on a first set of credits associated with the first user. The first set of credits may represent a first amount of previous API requests associated with the first user, and the first set of credits may indicate that the first user has access to a particular tool included in the first set of tools.

In operation 906, a first response to the first query is generated by the MCP server by executing, via the one or more API requests, a subset of the first set of tools. The first response can be the same as or generally similar to the first response 640-1 as described in relation to FIG. 6 above. In some embodiments, determining the subset of the first set of tools includes determining, using one or more AI agents, a semantic meaning of the query, comparing, using the one or more AI agents, the semantic meaning to one or more descriptions associated with one or more tools from the first set of tools, and based on the comparing, determining, using the one or more AI agents, the subset of the first set of tools to execute to respond to the query. Additionally or alternatively, for each tool from the subset of the first set of tools, the tool is provided as input, via the one or more API requests, a set of context tokens based on the first query, causing the tool to generate, as output, a tool result. The tool result may then be received from the tool. Each received tool result may be compiled (e.g., by the one or more AI agents) to generate the first response. The one or more AI agents may be the same as or generally similar to the one or more AI agents 638 described in relation to FIG. 6 above. In operation 908, the first response is provided, via the MCP server, to the first MCP client.

In operation 910, a second query is received, at the MCP server, from a second MCP client. The second query is associated with a second user of the workspace application, the second user being different from the first user. The second user is also associated, within the workspace application, with a second query permission property different from the first query permission property. The second MCP client can be the same as or generally similar to the second MCP client 606-2 as described in relation to FIG. 6 above. The second user can be the same as or generally similar to the second user 602-2 as described in relation to FIG. 6 above. The second query permission property may be based on different factors than the first query permission property, such as a different subscription level, a different set of credits, and/or a different user role. In some embodiments, the first query permission property is based on the first user having a first subscription level within the workspace application, and the second query permission property is based on the second user having a second subscription level within the workspace application, the second subscription level including fewer features than the first subscription level. In these and other embodiments, the second query permission property may be based on a second set of credits associated with the second user. The second set of credits may represent a second amount of previous API requests associated with the second user and the second set of credits may indicate that the second user does not have access to the particular tool included in the first set of tools, the particular tool not being included in the second set of tools.

In operation 912, a second set of tools is selected for responding to the second query based on the second query permission property. The second set of tools may include fewer or different tools compared to the first set of tools, reflecting the different permission properties associated with the second user. For example, the first set of tools may include at least one tool that is not included in the second set of tools. The second set of tools can be the same as or generally similar to the second set of tools 636-2 as described in relation to FIG. 6 above.

In operation 914, a second response to the second query is generated by the MCP server. The second response can be the same as or generally similar to the second response 640-2 as described in relation to FIG. 6 above. The second response may be generated using tools available in the second set of tools, which may result in different content than the first response. In some embodiments, generating the second response to the second query includes (1) determining a subset of the second set of tools to execute to respond to the query, (2) for each tool from the subset of the second set of tools, providing as input, via the one or more API requests, a set of context tokens based on the second query to the tool that generates, as output, a tool result and receiving, from the tool, the tool result, and (3) compiling each received tool result to generate the second response. In other embodiments, generating the second response to the second query comprises determining that the second set of tools is insufficient to respond to the query and generating an insufficiency notification as the second response.

In operation 916, the second response is provided, via the MCP server, to the second MCP client. The second response may be transmitted to the second MCP client and may differ in complexity, detail, or functionality compared to the first response based on the tools available to the second user through the respective permission properties of the second user.

Computer System

Figure 10:
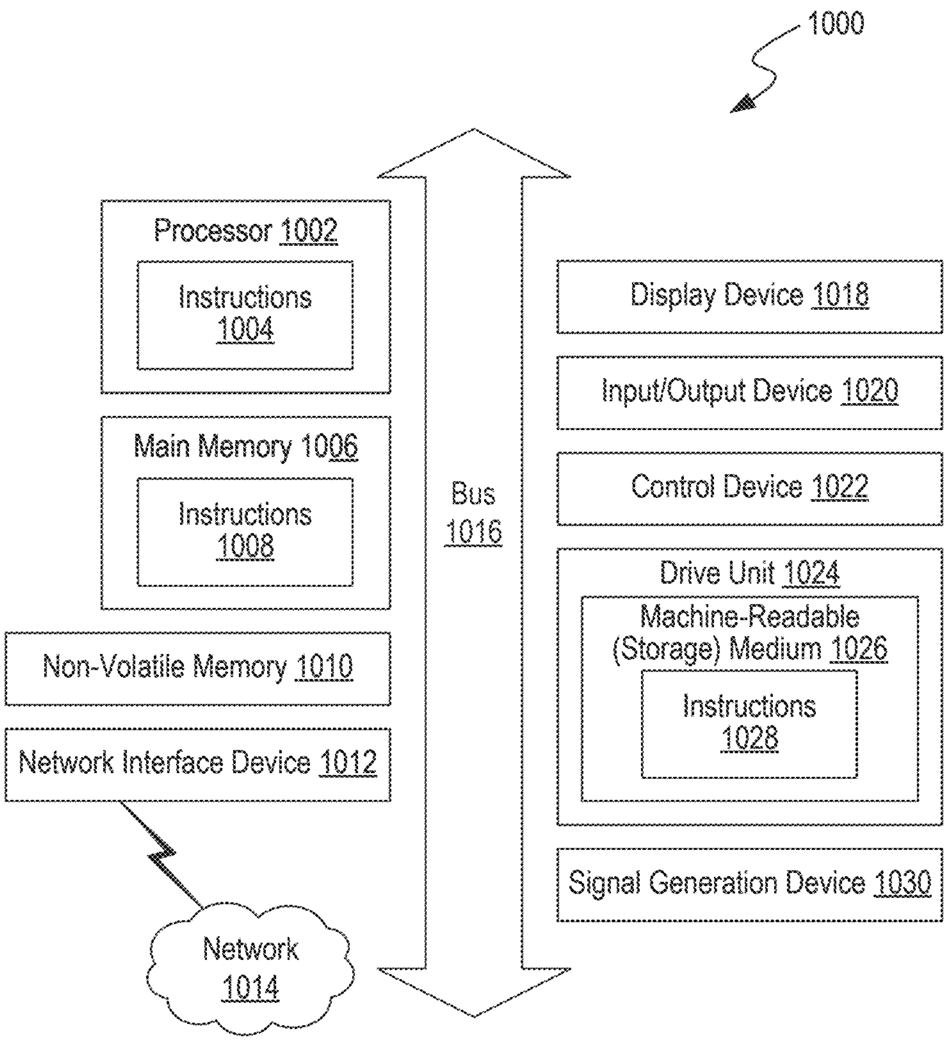
FIG. 10 is a block diagram that illustrates an example of a computer system in which at least some operations described herein may be implemented.

FIG. 10 is a block diagram that illustrates an example of a computer system 1000 in which at least some operations described herein may be implemented. As shown, the computer system 1000 may include: one or more processors 1002, main memory 1006, non-volatile memory 1010, a network interface device 1012, a display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification may be implemented.

The computer system 1000 may take any suitable physical form. For example, the computer system 1000 may share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 1000. In some implementations, the computer system 1000 may be an embedded computer system, a system-on-chip (SOC), a single-board computer (SBC) system, or a distributed system such as a mesh of computer systems or include one or more cloud components in one or more networks. Where appropriate, one or more computer systems 1000 may perform operations in real time, near real time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) may be local, remote, or distributed. Although shown as a single medium, the machine-readable medium 1026 may include multiple media (e.g., a centralized/distributed database and/or associated caches and servers) that store one or more sets of instructions 1028. The machine-readable medium 1026 may include any medium that is capable of storing, encoding, or carrying a set of instructions for execution by the computer system 1000. The machine-readable medium 1026 may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

Remarks

The terms "example," "embodiment," and "implementation" are used interchangeably. For example, references to "one example" or "an example" in the disclosure may be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example may be included in another example of the disclosure. Moreover, various features are described that may be exhibited by some examples and not by others. Similarly, various requirements are described that may be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing may be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements may be physical, logical, or a combination thereof. Additionally, the words "herein," "above," "below," and words of similar import may refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations may employ differing values or ranges.

Details of the disclosed implementations may vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations may include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention may be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim may be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media comprising instructions recorded thereon, wherein the instructions, when executed by at least one data processor of a system, cause the system to:

receive, at a model context protocol (MCP) server, a first query from a first MCP client,
- wherein the first query is associated with a first user of a workspace application, and
- wherein the first user is associated, within the workspace application, with a first query permission property;

based on the first query permission property, select a first set of tools for responding to the first query,
- wherein each tool from the first set of tools is accessible by the MCP server via one or more API requests,
- wherein each tool from the first set of tools, when executed, performs a particular function within the workspace application, and
- wherein each tool from the first set of tools is associated with a description of the particular function performed when the tool is executed;

generate, by the MCP server, a first response to the first query by:
- determining a subset of the first set of tools to execute to respond to the first query;
- for each tool from the subset of the first set of tools:
  - providing as input, via the one or more API requests, a first set of context tokens based on the first query to the tool that generates, as output, a tool result; and
  - receiving, from the tool, the tool result; and
- compiling each received tool result to generate the first response;

provide, via the MCP server, the first response to the first MCP client;

receive, at the MCP server, a second query from a second MCP client,
- wherein the second query is associated with a second user of the workspace application,
- wherein the second user is different from the first user, and
- wherein the second user is associated, within the workspace application, with a second query permission property different from the first query permission property;

based on the second query permission property, select a second set of tools for responding to the second query,
- wherein the first set of tools includes at least one tool that is not included in the second set of tools;

generate, by the MCP server, a second response to the second query; and provide, via the MCP server, the second response to the second MCP client.

2. The one or more non-transitory, computer-readable storage media of claim 1:

wherein the first query permission property is based on a first set of credits associated with the first user, wherein the first set of credits represents a first amount of previous API requests associated with the first user, wherein the first set of credits indicates that the first user has access to a particular tool included in the first set of tools, wherein the second query permission property is based on a second set of credits associated with the second user, wherein the second set of credits represents a second amount of previous API requests associated with the second user, wherein the second set of credits indicates that the second user does not have access to the particular tool, and wherein the particular tool is not included in the second set of tools.

3. The one or more non-transitory, computer-readable storage media of claim 1:

wherein the first query permission property is based on the first user having a first subscription level within the workspace application, and wherein the second query permission property is based on the second user having a second subscription level within the workspace application, the second subscription level including fewer features than the first subscription level.

4. The one or more non-transitory, computer-readable storage media of claim 1, wherein determining the subset of the first set of tools comprises:

determining, using one or more AI agents, a semantic meaning of the first query;

comparing, using the one or more AI agents, the semantic meaning to one or more descriptions associated with one or more tools from the first set of tools; and based on the comparing, determining, using the one or more AI agents, the subset of the first set of tools to execute to respond to the first query.

5. The one or more non-transitory, computer-readable storage media of claim 4, wherein each received tool result is compiled by the one or more AI agents to generate the first response.

6. The one or more non-transitory, computer-readable storage media of claim 1, wherein generating the second response to the second query comprises:

determining a subset of the second set of tools to execute to respond to the second query;

for each tool from the subset of the second set of tools:

providing as input, via the one or more API requests, a second set of context tokens based on the second query to the tool that generates, as output, a tool result; and receiving, from the tool, the tool result; and compiling each received tool result to generate the second response.

7. The one or more non-transitory, computer-readable storage media of claim 1, wherein generating the second response to the second query comprises:

determining that the second set of tools is insufficient to respond to the second query; and generating an insufficiency notification as the second response.

8. A system comprising:

at least one hardware processor; and at least one non-transitory memory storing instructions, which, when executed by the at least one hardware processor, cause the system to:

receive, at a model context protocol (MCP) server, a first query from a first MCP client, wherein the first query is associated with a first user of a workspace application, and wherein the first user is associated, within the workspace application, with a first query permission property;

based on the first query permission property, select a first set of tools for responding to the first query, wherein each tool from the first set of tools is accessible by the MCP server via one or more API requests, wherein each tool from the first set of tools, when executed, performs a particular function within the workspace application, and wherein each tool from the first set of tools is associated with a description of the particular function performed when the tool is executed;

generate, by the MCP server, a first response to the first query by executing, via the one or more API requests, a subset of the first set of tools;

provide, via the MCP server, the first response to the first MCP client;

receive, at the MCP server, a second query from a second MCP client, wherein the second query is associated with a second user of the workspace application, wherein the second user is different from the first user, and wherein the second user is associated, within the workspace application, with a second query permission property different from the first query permission property;

based on the second query permission property, select a second set of tools for responding to the second query, wherein the first set of tools includes at least one tool that is not included in the second set of tools;

generate, by the MCP server, a second response to the second query; and provide, via the MCP server, the second response to the second MCP client.

9. The system of claim 8:

wherein the first query permission property is based on a first set of credits associated with the first user, wherein the first set of credits represents a first amount of previous API requests associated with the first user, wherein the first set of credits indicates that the first user has access to a particular tool included in the first set of tools, wherein the second query permission property is based on a second set of credits associated with the second user, wherein the second set of credits represents a second amount of previous API requests associated with the second user, wherein the second set of credits indicates that the second user does not have access to the particular tool, and wherein the particular tool is not included in the second set of tools.

10. The system of claim 8:

wherein the first query permission property is based on the first user having a first subscription level within the workspace application, and wherein the second query permission property is based on the second user having a second subscription level within the workspace application, the second subscription level including fewer features than the first subscription level.

11. The system of claim 8, wherein determining the subset of the first set of tools comprises:

determining, using one or more AI agents, a semantic meaning of the first query;

comparing, using the one or more AI agents, the semantic meaning to one or more descriptions associated with one or more tools from the first set of tools; and based on the comparing, determining, using the one or more AI agents, the subset of the first set of tools to execute to respond to the first query.

12. The system of claim 11, wherein each received tool is compiled by the one or more AI agents to generate the first response.

13. The system of claim 8, wherein executing the subset of the first set of tools comprises:

for each tool from the subset of the first set of tools:

providing as input, via the one or more API requests, a set of context tokens based on the first query to the tool that generates, as output, a tool result; and receiving, from the tool, the tool result; and compiling each received tool result to generate the first response.

14. A method comprising:

receiving, at a model context protocol (MCP) server, a first query from a first MCP client, wherein the first query is associated with a first user of a workspace application, and wherein the first user is associated, within the workspace application, with a first query permission property;

based on the first query permission property, selecting a first set of tools for responding to the first query, wherein each tool from the first set of tools is accessible by the MCP server via one or more API requests, wherein each tool from the first set of tools, when executed, performs a particular function within the workspace application, and wherein each tool from the first set of tools is associated with a description of the particular function performed when the tool is executed;

generating, by the MCP server, a first response to the first query by executing, via the one or more API requests, a subset of the first set of tools;

providing, via the MCP server, the first response to the first MCP client;

receiving, at the MCP server, a second query from a second MCP client, wherein the second query is associated with a second user of the workspace application, wherein the second user is different from the first user, and wherein the second user is associated, within the workspace application, with a second query permission property different from the first query permission property;

based on the second query permission property, selecting a second set of tools for responding to the second query, wherein the first set of tools includes at least one tool that is not included in the second set of tools;

generating, by the MCP server, a second response to the second query; and providing, via the MCP server, the second response to the second MCP client.

15. The method of claim 14:

wherein the first query permission property is based on a first set of credits associated with the first user, wherein the first set of credits represents a first amount of previous API requests associated with the first user, wherein the first set of credits indicates that the first user has access to a particular tool included in the first set of tools, wherein the second query permission property is based on a second set of credits associated with the second user, wherein the second set of credits represents a second amount of previous API requests associated with the second user, wherein the second set of credits indicates that the second user does not have access to the particular tool, and wherein the particular tool is not included in the second set of tools.

16. The method of claim 14:

wherein the first query permission property is based on the first user having a first subscription level within the workspace application, and wherein the second query permission property is based on the second user having a second subscription level within the workspace application, the second subscription level including fewer features than the first subscription level.

17. The method of claim 14, wherein determining the subset of the first set of tools comprises:

determining, using one or more AI agents, a semantic meaning of the first query;

comparing, using the one or more AI agents, the semantic meaning to one or more descriptions associated with one or more tools from the first set of tools; and based on the comparing, determining, using the one or more AI agents, the subset of the first set of tools to execute to respond to the first query.

18. The method of claim 14, wherein executing the subset of the first set of tools comprises:

for each tool from the subset of the first set of tools:

providing as input, via the one or more API requests, a set of context tokens based on the first query to the tool that generates, as output, a tool result; and receiving, from the tool, the tool result; and compiling each received tool result to generate the first response.

19. The method of claim 14, wherein generating the second response to the second query comprises:

determining a subset of the second set of tools to execute to respond to the first query;

for each tool from the subset of the second set of tools:

providing as input, via the one or more API requests, a set of context tokens based on the second query to the tool that generates, as output, a tool result; and receiving, from the tool, the tool result; and compiling each received tool result to generate the second response.

20. The method of claim 14, wherein generating the second response to the second query comprises:

determining that the second set of tools is insufficient to respond to the first query; and generating an insufficiency notification as the second response.

* * * * *